United States Patent
Ide

(10) Patent No.: US 8,254,236 B2
(45) Date of Patent: Aug. 28, 2012

(54) OPTICAL INFORMATION REPRODUCING APPARATUS

(75) Inventor: Tatsuro Ide, Kawasaki (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 0 days.

(21) Appl. No.: 13/038,692

(22) Filed: Mar. 2, 2011

(65) Prior Publication Data

US 2012/0002516 A1    Jan. 5, 2012

(30) Foreign Application Priority Data

Jul. 5, 2010   (JP) .................................. 2010-152594

(51) Int. Cl.
*G11B 7/00* (2006.01)

(52) U.S. Cl. .............................. 369/112.01; 369/112.03

(58) Field of Classification Search ............. 369/112.01, 369/112.02, 112.03, 112.012, 112.17, 110.01, 369/44.23, 44.24, 44.41
See application file for complete search history.

(56) References Cited

U.S. PATENT DOCUMENTS 5,367,512 A * 11/1994 Satou et al. ................ 369/44.23
2008/0067321 A1   3/2008 Miyamoto et al.

FOREIGN PATENT DOCUMENTS

| JP | 05-342678 | 12/1993 |
| JP | 06-223433 | 8/1994 |
| JP | 2001-273640 | 10/2001 |

* cited by examiner

*Primary Examiner* — Nabil Hindi
(74) *Attorney, Agent, or Firm* — Antonelli, Terry, Stout & Kraus, LLP.

(57) ABSTRACT

A light beam emitted from a laser source is divided into a first light beam and a second light beam. An optical divider is further provided to separate a combined light beam of the first and second light beams into a first light bundle near the optical axis and a second light bundle in the edge portion and to diverge the first and second light bundles so that the first and second light bundles are individually detected by plural detectors. The first light beam is signal light focused on an optical information recording medium by an objective lens and reflected off the medium, and the second light beam is reference light not focused on the optical information recording medium. A focus error signal is then detected for the first light bundle for compensating focus error.

7 Claims, 17 Drawing Sheets

OPTICAL INFORMATION REPRODUCING APPARATUS

CLAIM OF PRIORITY

The present application claims priority from Japanese patent application JP2010-152594 filed on Jul. 5, 2010, the content of which is hereby incorporated by reference into this application.

BACKGROUND OF THE INVENTION

1. Field of the Invention

The present invention relates to readout signals with an increased signal to noise ratio in an optical information reproducing apparatus.

2. Description of the Related Art

For optical disks, Blu-ray Disc™ using a blue-violet semiconductor laser and a high numerical aperture (NA) objective lens having a numerical aperture of 0.85 becomes commercially available, reaching almost the limit to the resolution of optical systems. In order to aim for a further increase in capacity, it can be considered that an increase in the number of recording layers is most likely in future. For years, disks according to Blu-ray Disc Rewritable Dual Layer having a layer spacing of 25 μm between recording layers are commercially available, which are used for image storage media of recorders and data storage media of personal computers.

In such multilayer optical disks, because it is necessary to provide almost the same light quantity that is detected from each of individual recording layers, the reflectance of a certain recording layer is inevitably made small in association with an increase in the number of recording layers. Because of this, there is a problem in that the signal-to-noise ratio of the readout signal from each of the individual recording layers is decreased.

In addition, in the case in which a laser beam is directed to a multilayer optical disk, this causes plural layers to be irradiated at the same time. Thus, the signal-to-noise ratio of the readout-signal is also reduced due to the stray light reflected off a recording layer other than the target layer from which information is reproduced, i.e., due to interlayer crosstalk.

However, for optical disks, the data transfer rate is still increasing because of the necessity of an increased dubbing speed for video or the like while the capacity is increasing, so that it becomes difficult to sufficiently ensure the signal-to-noise ratio of the readout signal as matters stand. Therefore, in order to advance increases in the number of recording layers and in the data transfer rate in future at the same time, it is necessary to provide the readout signal with an increased signal to noise ratio.

Techniques relating to providing the readout signal of the optical disk with an increased signal to noise ratio are described in Japanese Patent Application Laid-Open Publication Nos. Hei 5-342678 and Hei 6-223433. They all relate to aiming for providing the readout signal of the magneto-optical disk with an increased signal to noise ratio by amplifying the amplitude of a weak signal, in which a light beam from a semiconductor laser is divided into light beams before directed to an optical disk and the divided light beam not to be directed to the optical disk is combined with the divided light beam reflected off the optical disk for interference to increase the quantity of the light beam not to be directed to the optical disk. In differential detection between transmitted light and reflected light at a polarizing beam splitter that is conventionally used in the signal detection of the magneto-optical disk, inherently, an original incident polarized component is caused to interfere with a polarized component, which is produced due to rotary polarization by the magneto-optical disk and orthogonal to the incident polarization direction, and the orthogonal polarized component is amplified with the incident polarized light for detection. Thus, although a signal can be increased if the original incident polarized component is increased, it is necessary to control the light intensity that enters the optical disk to a certain point or below, in order not to erase or overwrite data. In contrast to this, in the conventional-techniques mentioned above, a light beam for interference with signal light is separated in advance, this light beam, which is not focused on the disk, is caused to interfere with the signal light, and the intensity of the light beam for interference used for signal amplification can be made intensified, regardless of the light intensity at the disk surface. Theoretically, this allows an increased signal-to-noise ratio as compared with the noise of an amplifier that converts a photocurrent from a photo detector into a voltage, shot noise produced in a photo detector, or the like, as the intensity is more increased within a permissive range of light intensity.

In Japanese Patent Application Laid-Open Publication No. Hei 5-342678, two light beams are caused to interfere with each other to detect interference intensity. At this time, the optical path length of the light beam that does not reflect off the disk for interference is made variable. This aims to ensure the amplitude of the interference signal. In Japanese Patent Application Laid-Open Publication No. Hei 6-223433, in addition to the interference intensity detection, differential detection is also performed. As a result of this, the intensity component of each of individual light beams not contributing to signals is cancelled, and the noise component of each of the individual light beams is canceled, aiming for an increased signal to noise ratio. For differential detection in this case, a non-polarizing beam splitter is used.

For an exemplary technique that reduces interlayer crosstalk, Japanese Patent Application Laid-Open Publication No. 2001-273640 describes a method for reducing crosstalk by signal processing, by adopting a scheme in which a reflected light beam is divided into three beams to detect a light beam reflected off each of individual layers (a target readout layer and two layers adjacent to the target layer) at different focus positions.

SUMMARY OF THE INVENTION

The optical systems of the interferometers used in Japanese Patent Application Laid-Open Publication Nos. Hei 5-342678 and Hei 6-223433 are the optical system of the Mach-Zehnder type interferometer that has many optical) components and is unsuitable for a reduction in the size of optical systems. The Mach-Zehnder type interferometer is an interferometer having an optical system in which a divider that first divides a light beam into signal light and reference light is different from a device that again combines the reference light with the signal light, which has some modulation as a signal, for interference. In contrast to this, it is the optical system of the Twyman-Green type or Michelson type interferometer that signal light and reference light are returned to a first divider for interference. The reason why the optical system of the Mach-Zehnder type interferometer is used in the foregoing conventional techniques is not described in detail in Japanese Patent Application Laid-Open Publication Nos. Hei 5-342678 and Hei 6-223433. However, it is thought that it is necessary to arrange a half wave plate, which is rotationally adjustable, in the optical path for interference in such a way that the light is caused to pass in one way, not two ways, in order to adjust the polarization direction of a light beam for interference because the signal light of the magneto-optical disk is produced by rotary polarization. For another problem, a method of adjusting the path difference between two light beams is not described specifically, leading to difficulties in practical use. Regarding this problem, Japanese Patent Application Laid-Open Publication No. Hei 6-223433 describes that a reference mirror for obtaining a light beam for interference is arranged at the disk apart from a recoding film. However, this is a proposal of a disk according to a new standard, and this is not a technique to provide existing disks with an increased signal to noise ratio. Furthermore, Japanese Patent Application Laid-Open Publication Nos. Hei 5-342678 and Hei 6-223433 do not mention interlayer crosstalk on the multilayer optical disk.

On the other hand, Japanese Patent Application Laid-Open Publication No. 2001-273640 has drawbacks that light intensity is reduced to decrease the signal-to-noise ratio because the reflected light is divided into three beams.

In light of the foregoing problems, it is an object of the present invention to provide an optical information reproducing apparatus that performs interference detection of optical information signals with easy adjustment of the path difference between two light beams and excellent signal amplification effect. More particularly, it is an object of the present invention to provide an optical information reproducing apparatus that detects optical information signals with a high signal-to-noise ratio on a multilayer optical disk having a plurality of recording layers.

The following is a scheme of the present invention for addressing the foregoing problems.

Provided is an optical information reproducing apparatus in which a light beam emitted from a laser source is divided into a first light beam and a second light beam, the first light beam that is signal light focused on an optical information recording medium by an objective lens and reflected off the medium is combined with the second light beam that is reference light not focused on the optical information recording medium, and the combined light beam of the signal light and the reference light is focused with a condenser lens, and then detected by plural detectors for acquiring a readout signal. An optical divider is further provided to separate the combined light beam of the signal light and the reference light into a first light bundle near the optical axis and a second light bundle in the edge portion and to diverge the first and second light bundles so that the first and second light bundles are individually detected by the plurality of detectors. A focus error signal is then detected for the first light bundle, and the focus error signal is used to control a device that focuses and directs the signal light to the optical information recording medium for compensating, focus error. When consideration is given to the readout signals of the multilayer optical disk acquired from the plural photo detectors, the signal light and the reference light are focused on the light receiving devices of the detectors by the condenser lens, whereas the stray light is defocused on the detector, causing the degree of interference with the reference light to decrease. Because of this, the amplification factor of the stray light based on the reference light becomes smaller than the amplification factor of the signal light. As a result, interlayer crosstalk becomes significantly smaller than that in the conventional readout signal acquired only from the signal light. The same thing is applied to the tracking error signal of the multilayer optical disk.

On the other hand, when consideration is given to the focus error signal acquired from the plural photo detectors, the stray light is defocused on the detector as similar to the readout signal, so that the degree of interference with the reference light decreases. However, in the state in which focus control is not performed, the signal light also has a decreased degree of interference with the reference light because of focus error. This causes the defocus range, in which the focus error signal can be detected, to be narrowed greatly, resulting in difficulty of focus control. Here, only the first light bundle near the optical axis is used to decrease the defocus wave front aberration of the signal light due to focus error. Thus, it is possible to prevent the degree of interference of the reference light from dropping and to acquire a focus error signal that is detectable in a suitable defocus range and receives a small influence of interlayer crosstalk.

Accordingly, in a multilayer optical disk having plural recording layers, it is made possible to reduce interlayer crosstalk for the focus error signal as well as for the readout signal, to obtain the readout signal and the focus error signal with a high signal-to-noise ratio while the amplification effect of the signal light due to interference with the reference light is provided, and to improve the readout signal quality of the multilayer optical disk.

It is made possible to implement such an inexpensive interference optical information detecting method, optical pickup and optical disk apparatus that are producible in the same size as that of conventional optical disk apparatuses and exert highly excellent signal amplification effect. More particularly, it is made possible to acquire a readout signal with a high signal-to-noise ratio for a multilayer optical disk having plural recording layers.

BRIEF DESCRIPTION OF THE DRAWINGS

The present invention will become fully understood from the detailed description given hereinafter and the accompanying drawings, wherein.

DETAILED DESCRIPTION OF THE INVENTION

In the following, embodiments of the present invention will be described with reference to the drawings.

First Embodiment

Figure 1:
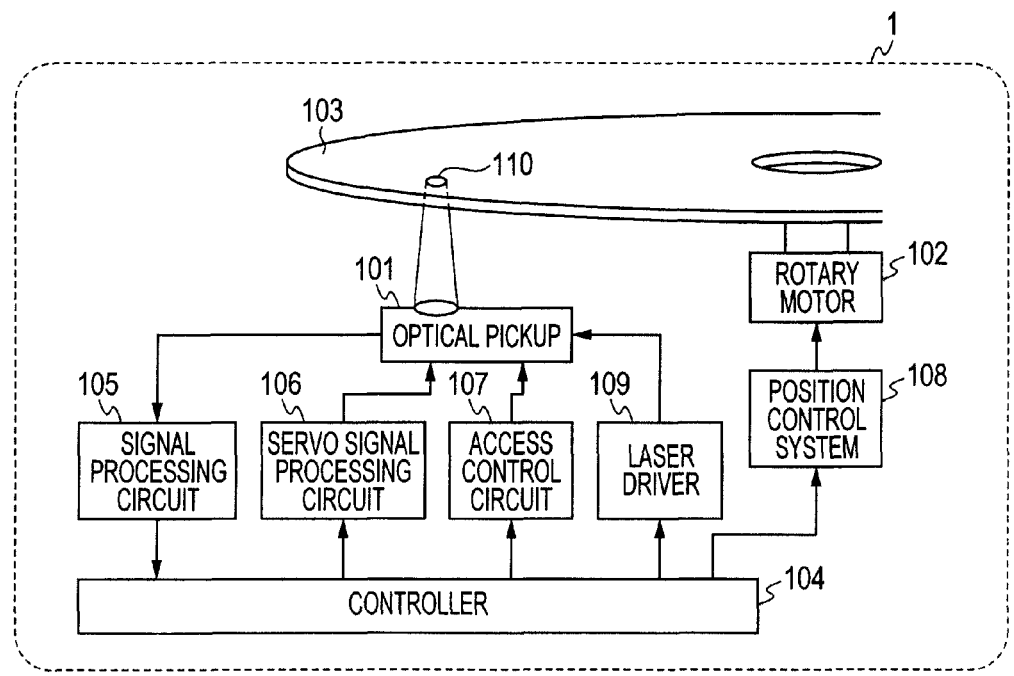
FIG. 1 is a schematic diagram showing an exemplary configuration of an optical information recording and reproducing apparatus according to the present invention.

FIG. 1 shows an exemplary overall configuration of an optical information recording and reproducing apparatus that implements an optical signal detection method according to the present invention.

1. Overall Structure of the Optical Information Recording and Reproducing Apparatus An optical information recording and reproducing apparatus 1 includes an optical pickup 101 and a rotary motor 102. An optical information recording medium 103 is rotatable by the rotary motor 102.

The optical pickup 101 directs a light beam to the optical information recording medium 103 for recording, reproducing, or both recording and reproducing digital information. The reproduced light detected by the optical pickup 101 is converted into a current-voltage (I-V), and then inputted to a signal processing circuit 105. The signal processing circuit 105 produces readout signals and servo signals, and sends the signals to a controller 104.

The controller 104 controls a servo control circuit 106, an access control circuit 107, and a position control system 108 based on the servo signal. The position control system 108 controls the rotation of the optical information recording medium 103 by the rotary motor 102. The access control circuit 107 controls the position of the optical pickup 101. The servo control circuit 106 controls the positions or the like of an objective lens and a reference light reflector of the optical pickup 101, described later. With this configuration, a light beam 110 is located at a given position on the optical information recording medium 103. Moreover, the controller 104 controls a laser driver 109 depending on reproduction or recording, and allows a laser included in the optical pickup 101, described later, to emit a light beam at a suited power/waveform.

2. Optical System Configuration of the Optical Pickup

Figure 2:
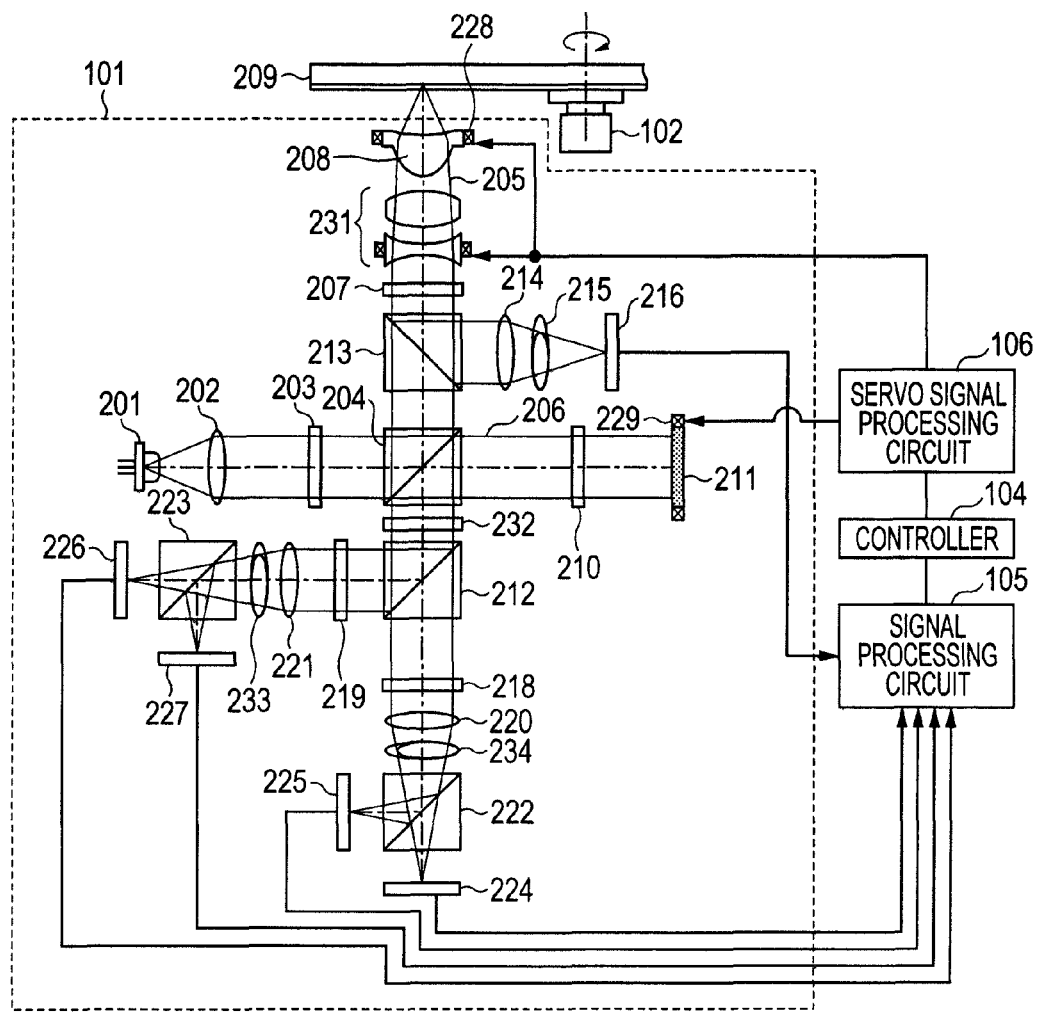
FIG. 2 is a diagram showing an exemplary configuration of an optical pickup that implements an optical information detecting method according to the present invention.

FIG. 2 shows an exemplary optical system configuration of the optical pickup 101 of the optical information recording and reproducing apparatus 1. The optical system of the optical pickup according to this embodiment includes an interference optical system and a detection optical system. The interference optical system guides a light beam emitted from a semiconductor laser to cause the light beam to reflect off an optical disk, and causes the reflected light and the reference light to interfere with each other to produce coherent light. The detection optical system separates the produced coherent light and gives a phase difference to each of individually separated beams of the coherent light for detecting the beams by a plurality of detectors.

2-1. Overall Configuration of the Pickup

A light beam emitted from a semiconductor laser 201 mounted on the optical pickup 101 is collimated to a collimated light beam by a collimating lens 202, and then transmitted through a first half wave plate 203 for rotating its polarization direction at an angle of 45 degrees. The light beam with rotated polarization is separated into two linearly polarized light beams orthogonal to each other by a first polarizing beam splitter 204. The vertically polarized light beam (s-polarized light beam) is reflected at the first polarizing beam splitter 204, and transmitted through a servo beam splitter 213. The beam is converted into a circularly polarized light beam after transmitted through a first quarter-wave plate 207. The beam is then transmitted through an expander lens 231 that corrects spherical aberration produced due to changes in the substrate thickness of an optical disk 209, focused by an objective lens 208, and directed to the optical disk 209. A beam of reflected light 205 from the optical disk 209 (in the following, referred to as signal light) is again collimated to a collimated light beam at the objective lens 208, and transmitted through the expander lens 231 and the first quarter-wave plate 207. A part of the signal light is reflected at the servo beam splitter 213, and the remaining light is transmitted. Although the signal light 205 is again converted into a linearly polarized light beam at the first quarter-wave plate 207, the rotating direction of the circularly polarized light beam is inverted since the signal light 205 is reflected off the disk surface. Thus, the signal light 205 is converted into a horizontally polarized light beam having the polarization direction orthogonal to the original light beam. Thus, the signal light 205 transmitted through the first quarter-wave plate 207 and the servo beam splitter 213 is then transmitted through the first polarizing beam splitter 204, going to a beam splitter 212. On the other hand, a horizontally polarized light beam (p-polarized light beam) 206, which is first transmitted through the first polarizing beam splitter 204, (in the following, referred to as reference light) is transmitted through a second quarter-wave plate 210, and converted into a circularly polarized light beam. The beam is reflected at a reference light reflector 211, and converted into a vertically polarized light beam having the polarization direction orthogonal to the original reference light at the second quarter-wave plate 210, as similar to the signal light 205. Because of this, the beam is reflected at the first polarizing beam splitter 204, and combined with the signal light 205, going to the direction of the beam splitter 212. At this time, the signal light 205 and the reference light 206 is combined, as their polarization directions are orthogonal to each other.

2-2. Light Separation for a PD 216 Exclusive to the Signal Light and for Homodyne PDs 224 to 227

The servo beam splitter 213 has a property that fully transmits the vertically polarized light beam and partially reflects and partially transmits the horizontally polarized light beam. Thus, the vertically polarized light beam, which is emitted from the semiconductor laser 201 and reflected at the polarizing beam splitter 204, is fully transmitted through the servo beam splitter 213, and directed to the optical disk 209, whereas the signal light 205, which is the horizontally polarized light beam reflected at the optical disk 209 and transmitted through the first quarter-wave plate 207, is partially reflected at and partially transmitted through the servo beam splitter.

Alternatively, it is possible that the servo beam splitter 213 has a property that fully reflects the vertically polarized light beam and partially reflects and partially transmits the horizontally polarized light beam. At this time, the first quarter-wave plate 207, the expander lens 231, the objective lens 208, and the optical disk 209 are arranged in the reflection optical path of the vertically polarized light beam by the servo beam splitter 213. In addition, the condenser lens 214, a cylindrical lens 215, and the photo detector 216 are arranged in the transmission optical path of the servo beam splitter 213 for the signal light 205 reflected off the optical disk 209.

2-3. Servo Signal Generation from PD 216

Figure 4A:
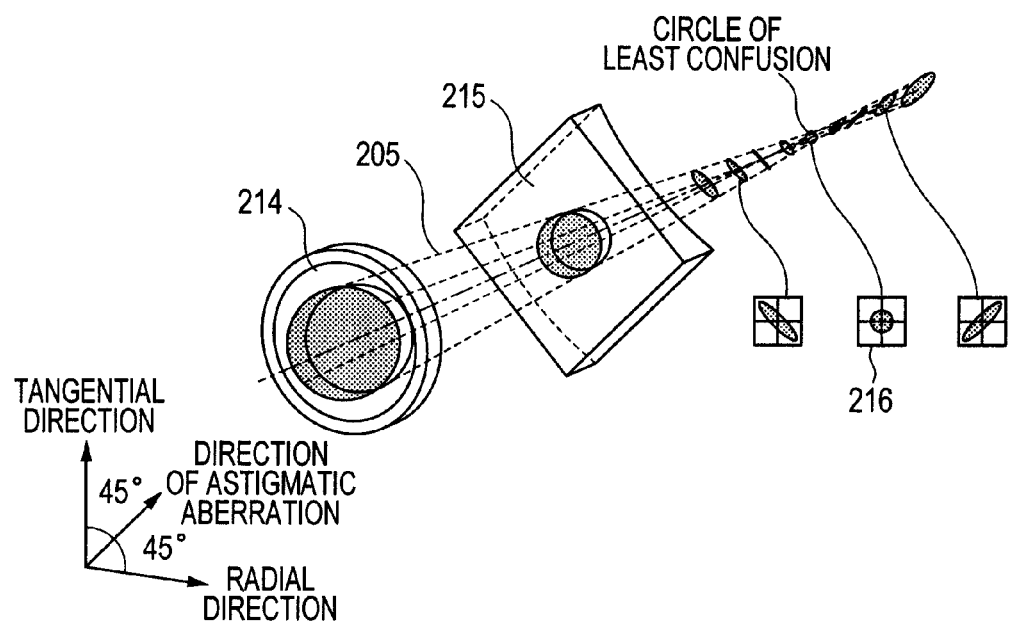
FIG. 4A is a diagram showing a light beam of signal light according to the present invention.
Figure 4B:
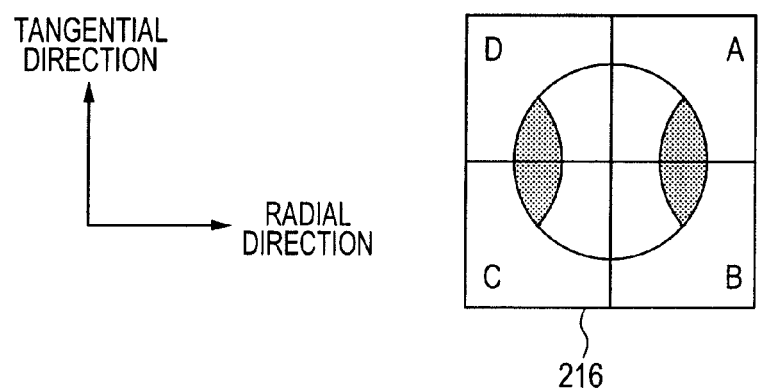
FIG. 4B is a schematic diagram showing a detector of the optical pickup according to the present invention.

A part of the signal light 205 reflected at the servo beam splitter 213 is provided with astigmatism through the condenser lens 214 and the cylindrical lens 215, and guided to the photo detector 216. The signal processing circuit 105 outputs a focus error signal FES and a tracking error signal TES acquired from the output signal of the photo detector 216. In the following, the focus-error and tracking-error signals acquired from the output signal of the photo detector 216 are designated FES 1 and TES 1, in order to discriminate them from FES and TES signals acquired from photo detectors 224 to 227, described later. FIG. 4A shows a light beam diagram of a part of the signal light 205 reflected at the servo beam splitter 213, and FIG. 4B shows the configuration of the photo detector 216. As shown in FIG. 4A, the photo detector 216 is arranged at the position at which the signal light 205 is focused by the condenser lens 214 and the cylindrical lens 215 to be the circle of least confusion. As shown in FIG. 4B, the photo detector 216 is divided into four regions, and outputs signals FES 1=(A+C)−(B+D), and TES 1=(A+B)−(C+D) through the signal processing circuit 105, where the output signals from the individual regions are A, B, C, and D. In addition, in this embodiment, the cylindrical lens 215 is disposed in order to show the case of using astigmatism for focus error signal detection. However, it is also possible to use knife-edge or spot size, for example, for focus error signal detection. In this case, the cylindrical lens 215 is unnecessary.

2-4. Generation of the RF Signal and Servo Signal from PDs 224 to 227

Figure 3:
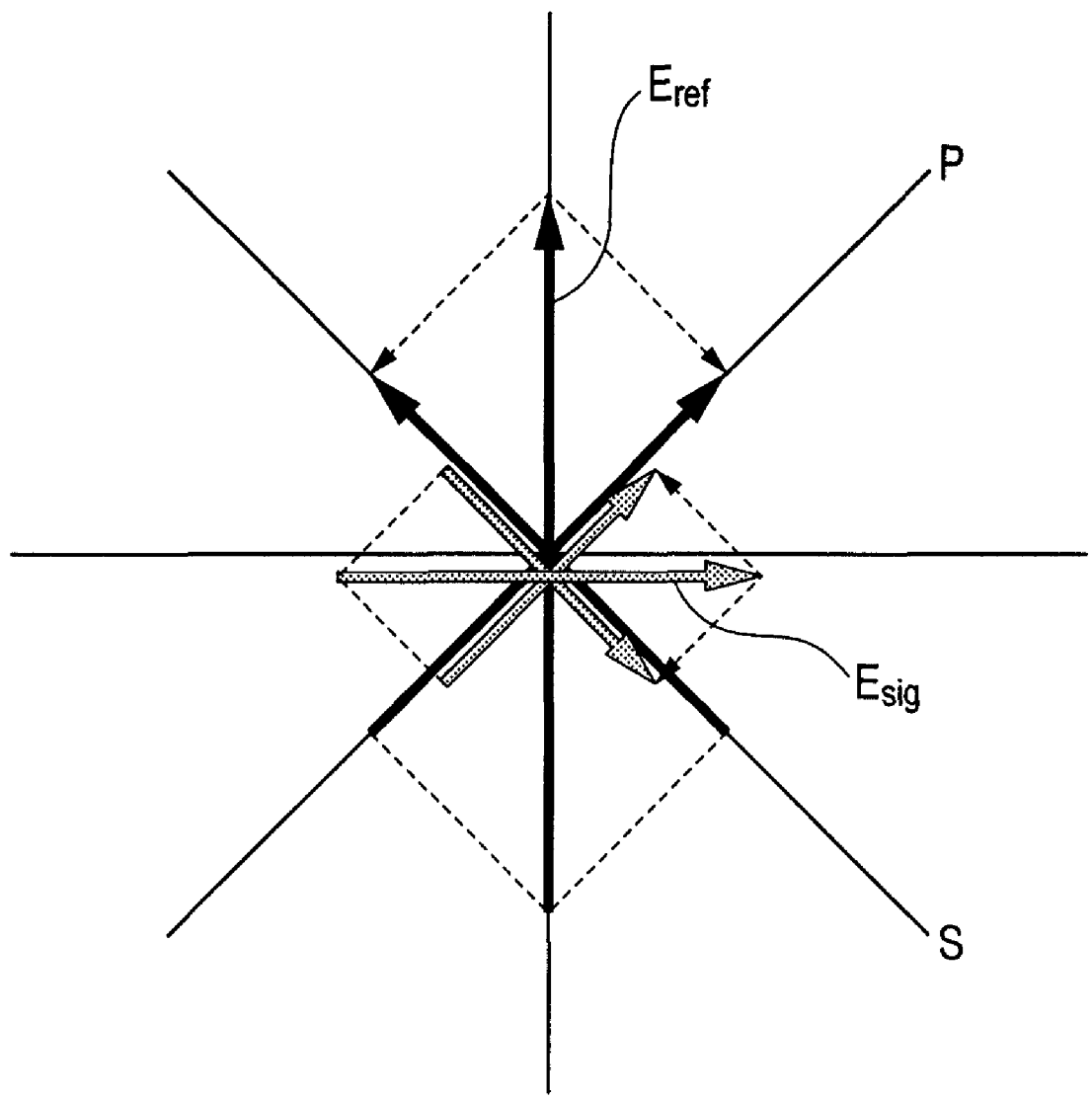
FIG. 3 is a diagram showing the polarization directions of signal light, reference light, and detected light.

A part of the combined light beam of the signal light 205 and the reference light 206 combined at the polarizing beam splitter 204 is transmitted through an optical divider 232 and the beam splitter 212 that is a half mirror, and is rotated in the polarization direction at an angle of 45 degrees by a second half wave plate 218. It is then focused by a condenser lens 220, and transmitted through a cylindrical lens 234. It is separated into linearly polarized light beams orthogonal to each other at a polarizing beam splitter 222, and detected by the first photo detector 224 (PD 1) and the second photo detector 225 (PD 2). In addition, it is possible that the cylindrical lens 234 is a device that produces astigmatism, which can be substituted by an inclined plane-parallel plate, for example. The photo detectors 224 and 225 are arranged at the positions at which the combined light beam of the signal light 205 and the reference light 206 is focused by the condenser lens 220 and the cylindrical lens 234 to be the circle of least confusion. FIG. 3 shows the relations between polarized components P and S of the light detected by the two photo detectors PD 1 and PD 2 and the polarization direction Esig of the signal light and the polarization direction Eref of the reference light. The photo detector PD 1 detects the p-polarized light beams, i.e., the projection components in the p-polarized directions of the polarization directions Esig and Eref, and the photo detector PD 2 detects the s-polarized light beams, i.e., the projection components in the s-polarized directions of the polarization directions Esig and Eref. In the projection components in the s-polarized direction, the sign of the polarization direction Eref looks inverted in this drawing. The signals detected at the photo detectors PD 1 and PD 2 are as shown below when expressed in equations.

$$I_{RF1} = \left| \frac{1}{2}E_{sig} + \frac{1}{2}E_{ref} \right|^2 \quad \text{Equation 1}$$

$$= \frac{1}{4}|E_{sig}|^2 + \frac{1}{4}|E_{ref}|^2 +$$

$$\frac{1}{2}|E_{sig}||E_{ref}|\cos(\varphi_{sig} - \varphi_{ref})$$

$$I_{RF2} = \left| \frac{1}{2}E_{sig} - \frac{1}{2}E_{ref} \right|^2 \quad \text{Equation 2}$$

$$= \frac{1}{4}|E_{sig}|^2 + \frac{1}{4}|E_{ref}|^2 -$$

$$\frac{1}{2}|E_{sig}||E_{ref}|\cos(\varphi_{sig} - \varphi_{ref})$$

Here, the signals are expressed in the square of the absolute value, because it is light energy to be detected. Here, for simplification, it is supposed that the light beams in the polarization directions Esig and Eref are full coherence.

The other part of the combined light beam of the signal light 205 and the reference light 206 combined at the polarizing beam splitter 204 is transmitted through the optical divider 232, reflected at the beam splitter 212 that is a half mirror, and converted into a circularly polarized light beam at a third quarter-wave plate 219 that is disposed as rotated at an angle of 45 degrees with respect to the polarization directions of the signal light 205 and the reference light 206. At this time, because the signal light 205 and the reference light 206 are different in the original polarization direction at an angle of 90 degrees, the other part of the combined light is converted into a circularly polarized light beam in the reverse rotating direction. This circularly polarized light beam is focused by the lens 221, and transmitted through a cylindrical lens 233. The beam is separated into linearly polarized light beams orthogonal to each other at the polarizing beam splitter 223, and detected at a third photo detector 226 (PD 3) and the fourth the photo detector 227 (PD 4). In addition, it is possible that the cylindrical lens 233 is a device that produces astigmatism, which can be substituted by an inclined plane-parallel plate, for example. The photo detectors 226 and 227 are arranged at the positions at which the combined light beam of the signal light 205 and the reference light 206 is focused by the condenser lens 221 and the cylindrical lens 233 to be the circle of least confusion. FIG. 3 similarly shows the relation between the polarized components P and S of the light beams detected at the two photo detectors PD 3 and PD 4 and the polarization direction Esig of the signal light and the polarization direction Eref of the reference light. However, the difference from the example of PD 1 and PD 2 is in that there is a phase difference between the polarization directions Esig and Esif at an angle of 90 degrees. The signals detected at the photo detectors PD 3 and PD 4 are as shown below when expressed in equations.

$$I_{RF3} = \left| \frac{1}{2}\exp\left(-i\frac{\pi}{4}\right)E_{sig} + \frac{1}{2}\exp\left(+i\frac{\pi}{4}\right)E_{ref} \right|^2 \quad \text{Equation 3}$$

$$= \frac{1}{4}|E_{sig}|^2 + \frac{1}{4}|E_{ref}|^2 +$$

$$\frac{1}{2}|E_{sig}||E_{ref}|\sin(\varphi_{sig} - \varphi_{ref})$$

-continued $$I_{RF4} = \left|\frac{1}{2}\exp\left(+i\frac{\pi}{4}\right)E_{sig} + \frac{1}{2}\exp\left(-i\frac{\pi}{4}\right)E_{ref}\right|^2 \quad \text{Equation 4}$$

$$= \frac{1}{4}|E_{sig}|^2 + \frac{1}{4}|E_{ref}|^2 -$$

$$\frac{1}{2}|E_{sig}||E_{ref}|\sin(\varphi_{sig} - \varphi_{ref})$$

In the equations, exp (±iπ/4) expresses that a phase difference at an angle of ±45 degrees (a difference at an angle of 90 degrees) is provided in the polarization directions Esig and Eref at the quarter-wave plate. The phase differences between the signal light 205 and the reference light 206 divided at the beam splitter 212 and the polarizing beam splitters 222 and 223 are different from each other at angles of 0, 180, 90, and 270 degrees on the four photo detectors PD 1, PD 2, PD 3, and PD 4, respectively, as shown in Equations 1 to 4.

As described above, because the signals detected at the individual detectors contain a component |Eref|² that is irrelevant to information on the optical disk 209, the following is held if a differential signal is found between the PD 1 and PD 2, and between the PD 3 and PD 4 for obtaining signals in the form of a product of the signal light amplitude intensity and the reference light amplitude intensity.

$$\text{Sig1} = I_{RF1} - I_{RF2} = |E_{sig}||E_{ref}|\cos(\phi_{sig} - \phi_{ref}) \quad \text{Equation 5}$$

$$\text{Sig2} = I_{RF3} - I_{RF4} = |E_{sig}||E_{ref}|\sin(\phi_{sig} - \phi_{ref}) \quad \text{Equation 6}$$

This shows that a large signal output can be obtained if the intensity of the reference light is increased. More specifically, it shows that the intensity of the signal light can be amplified.

Here, sin and cos are included in Equations 5 and 6, expressing the phase differences between the signal light and the reference light. However, the reference light and the signal light pass different optical paths, and the objective lens 208 vertically follows in association with the rotation of the disk accruing to focus servo. Thus, the optical path length of the signal light is changing all the time. As a result, the phase terms of Equations 5 and 6 are not defined, and the signals acquired according to this scheme change greatly.

For this reason, the signal processing circuit 105 calculates the sum of squares of Equations 5 and 6 for acquiring a signal.

$$S = (\text{Sig1})^2 + (\text{Sig2})^2 = |E_{sig}|^2|E_{ref}|^2 \quad \text{Equation 7}$$

Calculation is performed in this manner to stably and reliably acquire a constant signal even when the phases of the signal light and the reference light are changed. The sum of squares is calculated as Equation 7 to acquire a signal proportional to the signal light intensity |Esig|² for the output S, so that the same signal waveform as that of conventional CD, DVD, and BD is obtained for the RF signal. Moreover, the amplification factor is |Eref|², and it is shown that the reference light intensity is increased to raise the amplification factor. Furthermore, it is also possible that the square root is found to be the RF signal after calculation of the sum of squares. Calculation to find the square root obtains the output proportional to the square root of the signal light intensity, so that the RF signal is in the same signal waveform as that of conventional magneto-optical disks.

In addition, in this embodiment, the condenser lenses 220 and 221 and the cylindrical lenses 233 and 234 are used separately for the reflected light and the transmitted light from the half beam splitter 212. However, it is also possible that a condenser lens and a cylindrical lens are arranged before the light beam is divided at the half beam splitter 212 and shared for the reflected light and the transmitted light at the half beam splitter 212.

Figure 5:
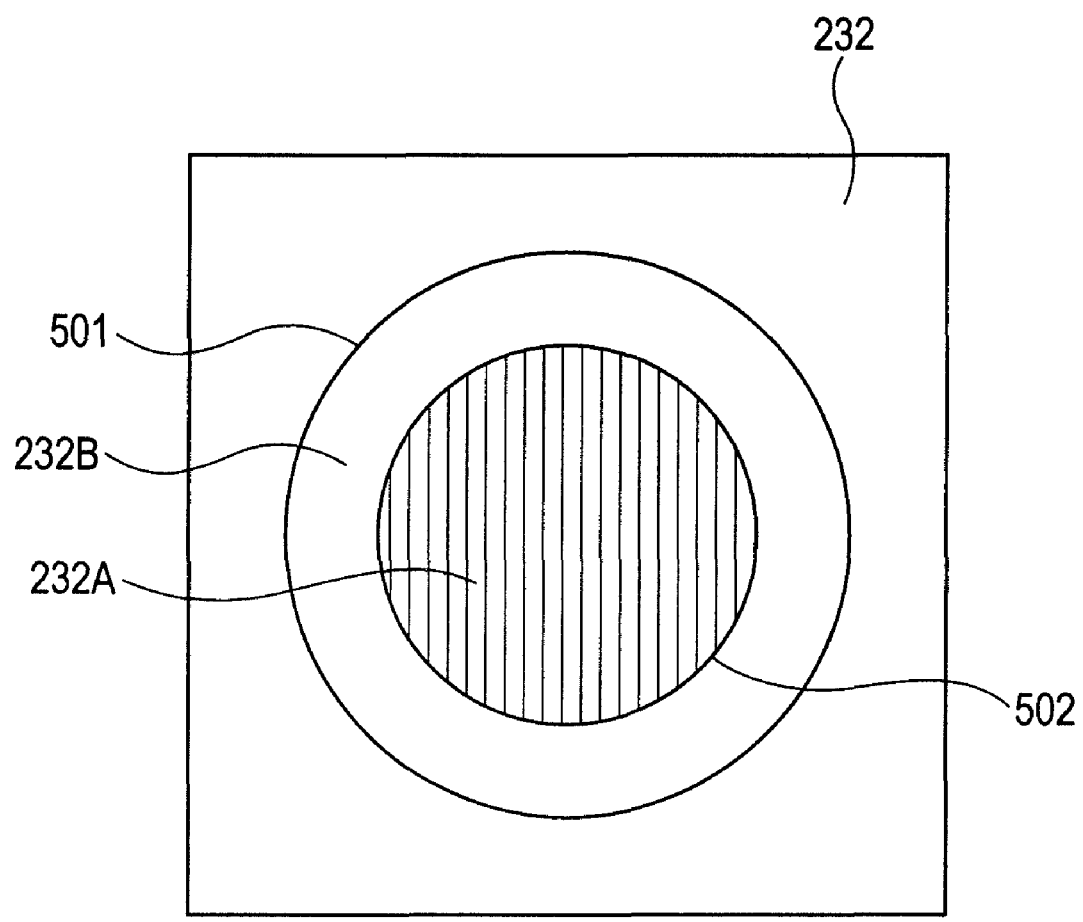
FIG. 5 is a schematic diagram showing an exemplary optical divider according to the present invention.
Figure 6:
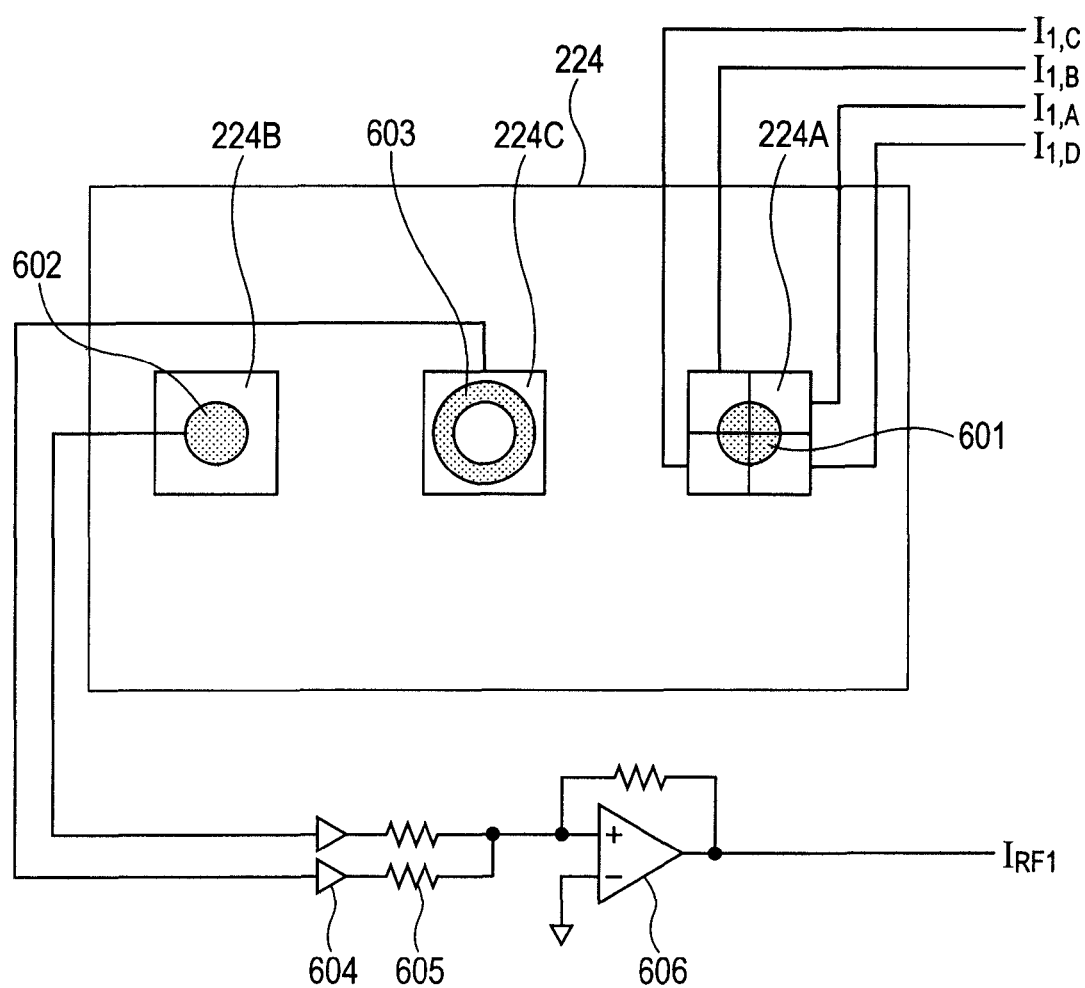
FIG. 6 is a schematic diagram showing an exemplary detector of the optical pickup according to the present invention.

FIG. 5 is a diagram showing an exemplary pattern of the optical divider 232 according to the present invention. In the optical divider 232, a boundary is established at a relatively small diameter 502 with respect to the diameter of an incident light beam 501, and a grating pattern is provided only for an inner region 232A between the inner region 232A and the outer region 232B. Here, the term "relatively small" means that 0<r<1 is satisfied where the ratio of the diameter 502 of the inner region 232A in the optical divider 232 to the incident light beam diameter 501 is r. In addition, the shape of the inner region 232A is not necessarily a circular shape, which may be a shape in a relatively small area for the incident light beam 501, and may be a rectangle, for example. The light beam that enters the inner region 232A is diffracted into positive and negative first-order light beams, and the light beam that enters the outer region 232B is transmitted. Thus, the light beam is divided into the inner and outer side bundles, and focused on the photo detectors 224, 225, 226, and 227. FIG. 6 shows an exemplary pattern of the photo detectors 224, 225, 226, and 227 in this embodiment. Because the four photo detectors 224, 225, 226, and 227 have the same configuration, the photo detector PD 1 (224) is used for explanation below. A positive first-order diffracted light beam 601 through the inner region 232A in the optical divider 232 is received at a four-part split light receiving region 224A, a negative first-order diffracted light beam 602 is received at a light receiving region 224B, and a transmitted light beam 603 through the outer region 232B in the optical divider 232 is received at light receiving region 224C. The positive first-order diffracted light beam 601 and the negative first-order diffracted light beam 602 through the inner region 232A in the optical divider 232 are respectively used for the servo signal and the RF signal, as described below. In order to use the light quantity as much as possible for the RF signal, desirably, the diffraction efficiency of the inner region 232A in the optical divider 232 satisfies $R_{+1} < R_{-1}$, where the diffraction efficiencies of the positive and negative first-order diffracted light beams are respectively $R_{+1}$ and $R_{-1}$. To this end, for the grating in the inner region, for example, a sawtooth blazed grating is used. The outputs of the light receiving regions 224B and 224C are converted into voltages at a buffer amplifier 604, added and subtracted at the differential amplifier 606 where a suited gain is set by a resistor 605, and then outputted as the RF signal $I_{RF1}$ shown in Equation 1. The RF signals $I_{RF2}$, $I_{RF3}$, and $I_{RF4}$ shown in Equations 2, 3, and 4 are also similarly outputted from the photo detectors PD 2 (225), PD 3 (226), and PD 4 (227). In the optical divider 232 shown in FIG. 5, the light beam is fully transmitted through the outer region 232B, whereas the light beam is partially diverged as the positive first-order diffracted light beam at the inner region 232A. Thus, the ratio of the detected light quantity to the incident light quantity is different between the light receiving regions 224B and 224C. For this reason, it is possible that the resistor 605 is adjusted as a variable resister. Signals $I_{1A}$, $I_{1B}$, $I_{1C}$, and $I_{1D}$ are outputted from the four-part split light receiving region 224A, and used for calculating the focus error signal, described below. A subscript 1 represents the photo detector number, and subscripts A, B, C, and D represent the corresponding four-part split light receiving regions. Signals $I_{2A}$, $I_{2B}$, $I_{2C}$, $I_{2D}$, $I_{3A}$, $I_{3B}$, $I_{3C}$, $I_{3D}$, $I_{4A}$, $I_{4B}$, $I_{4C}$, and $I_{4D}$ are also similarly outputted from the photo detectors PD 2 (225), PD 3 (226), and PD 4 (227). The focus error signal FES 2 is acquired as described below, for example, from an output $I_{XY}$ (X=1, 2, 3, 4, Y=A, B, C, D) obtained from the four-part split light receiving device of the photo detectors 224, 225, 226, and 227.

$$f(X, Y) = I_{X,Y} - I_{X+1,Y} \quad \text{Equation 8}$$

$$FES2 = \{f(1, A)^2 + f(3, A)^2 + f(1, C)^2 + f(3, C)^2\} - \\ \{f(1, B)^2 + f(3, B)^2 + f(1, D)^2 + f(3, D)^2\}$$

As similar to Equations 5 and 6, the differential signal f(X, Y) is first found between the photo detectors PD 1 and PD 2 (X=1), and between the photo detectors PD 3 and PD 4 (X=3), where Y=A, B, C, and D. After that, the sum of squares of f(1, Y) and f(3, Y) is found in each of the individual regions A to D in the four-part split light receiving device, so that a signal is acquired, which is independent of the phase change in the signal light and the reference light as similar to Equation 7. Finally, an astigmatic signal (a differential signal between the light receiving regions A+C and regions B+D) is obtained from differential operation for the sum of the outputs from the diagonal regions in the four-part split light receiving device.

Alternatively, the focus error signal FES 2 can also be acquired as below.

$$FES2 = \{[f(1, A) + f(1, C)]^2 + [f(3, A) + f(3, C)]^2\} - \\ \{[f(1, B) + f(1, D)]^2 + [f(3, B) + f(3, D)]^2\} \quad \text{Equation 9}$$

Figure 7A:
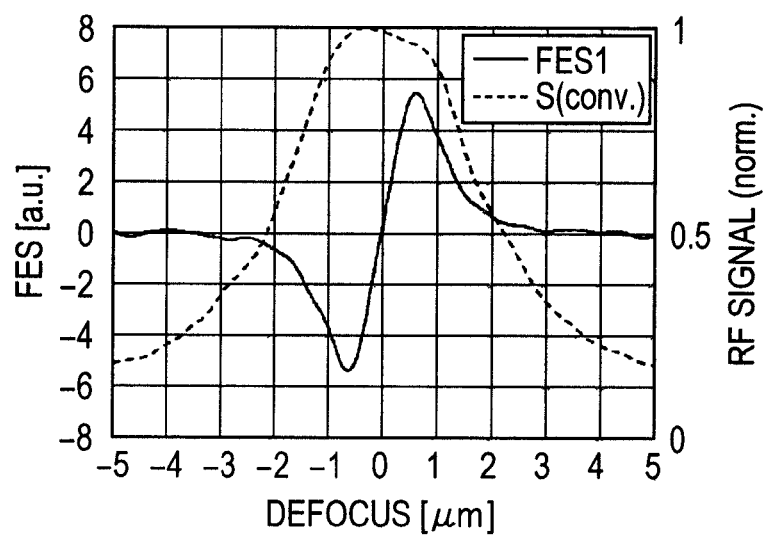
FIG. 7A is a graph showing a simulation result of a conventional focus error signal.
Figure 7B:
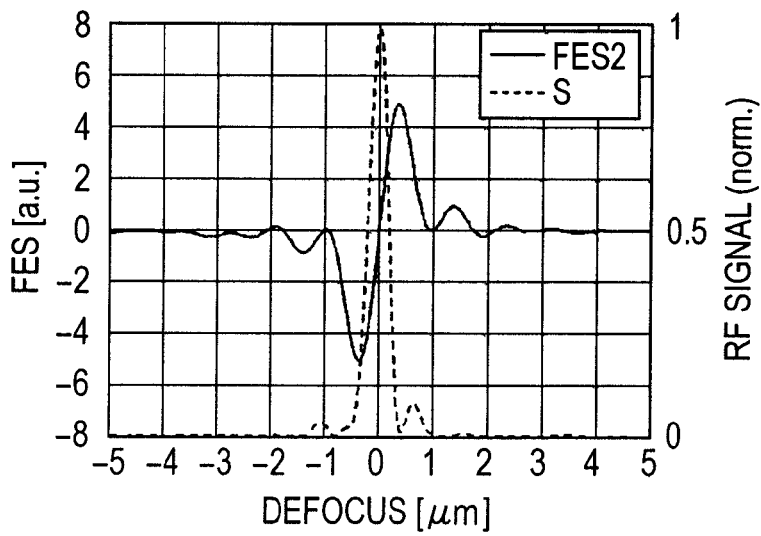
FIG. 7B is a graph showing a simulation result of a focus error signal according to the present invention.

FIGS. 7A and 7B are results that the focus error signal was confirmed according to computer simulation. Simulation was based on the scalar diffraction theory, and the light intensity distribution on the photo detector was found according to Fourier integrals. The following is calculation conditions: the wavelength was 405 nm; the objective lens had a numerical aperture of 0.85; the detection system condenser lens had a numerical aperture of 0.077; astigmatic difference in the detection system was 1.44 mm; the size of the four-part split light receiving region was 110 µm; the detector split line width was 5 µm; and the ratio r of the diameter 502 of the inner region 232A in the optical divider 232 to the incident light beam diameter 501 was 76.5%. FIG. 7A shows the defocus characteristics of a conventional focus error signal (solid line) and RF signal (broken line) acquired only from the signal light 205 at the photo detector 216, and FIG. 7B shows the defocus characteristics of the focus error signal (solid line) and the RF signal (broken line) at the photo detectors 224, 225, 226, and 227 according to Equation 8. Now referring to the RF signal (broken line), as compared with the RF signal acquired only from the signal light in FIG. 7A, the RF signal acquired from the combined light beam of the signal light and the reference light in FIG. 7B is suddenly attenuated as well as defocused. For this reason, the reflected light quantity from the layer shifted from the focus position of the objective lens 208 can be almost ignored, and it is a signal receiving a small influence of interlayer crosstalk on the multilayer optical disk. On the other hand, now referring to the focus error signal (solid line), the focus error signal FES 1 acquired only from the signal light in FIG. 7A has an acquisition range of about 1.2 µm, whereas the focus error signal FES 2 acquired from the combined light beam of the signal light and the reference light in FIG. 7B has that of about 0.7 µm, which is made smaller to about a half, being attenuated as well as defocused as compared with the signal FES 1, as similar to the RF signal. For this reason, it is possible to acquire such a focus error signal that is detectable in a suitable defocus range and receives a small influence of interlayer crosstalk. In addition, the focus acquisition range can be designed based on the ratio r (0<r<1) of the diameter 502 of the inner region 232A in the optical divider 232 to the incident light beam diameter 501; r is increased to more narrow the acquisition range, and to more reduce the influence of interlayer crosstalk.

2-5. Servo Control

The focus error signal produced at the signal processing circuit 105 is fed back to the focus drive terminal of a 2-dimensional actuator 228 mounted with the objective lens 208, through the controller 104 and the servo control circuit 106, and the focus position is controlled in a closed loop.

Moreover, the same signal is also fed back to a 1-dimensional actuator 229 mounted with the reference light reflector 211, and the reference light reflector 211 is also driven as tied with the objective lens 208. Thus, it is made possible to keep the path difference between the signal light 205 reflected off the optical disk 209 and the reference light 206 reflected off the reference light reflector 211 almost zero. Because the coherence length of a typical semiconductor laser is a few tens micrometers, it is fine that the accuracy for adjusting the path difference is at or below this range. Moreover, for the semiconductor laser 201, it is also possible to use such a laser that has a long coherence length of a few centimeters to a few meters, such as a DFB laser, for example. In this case, it is unnecessary to drive the reference light reflector 211 to make the path difference between the signal light and the reference light zero, and it is unnecessary to feed the focus error signal back to the 1-dimensional actuator 229.

Figure 8:
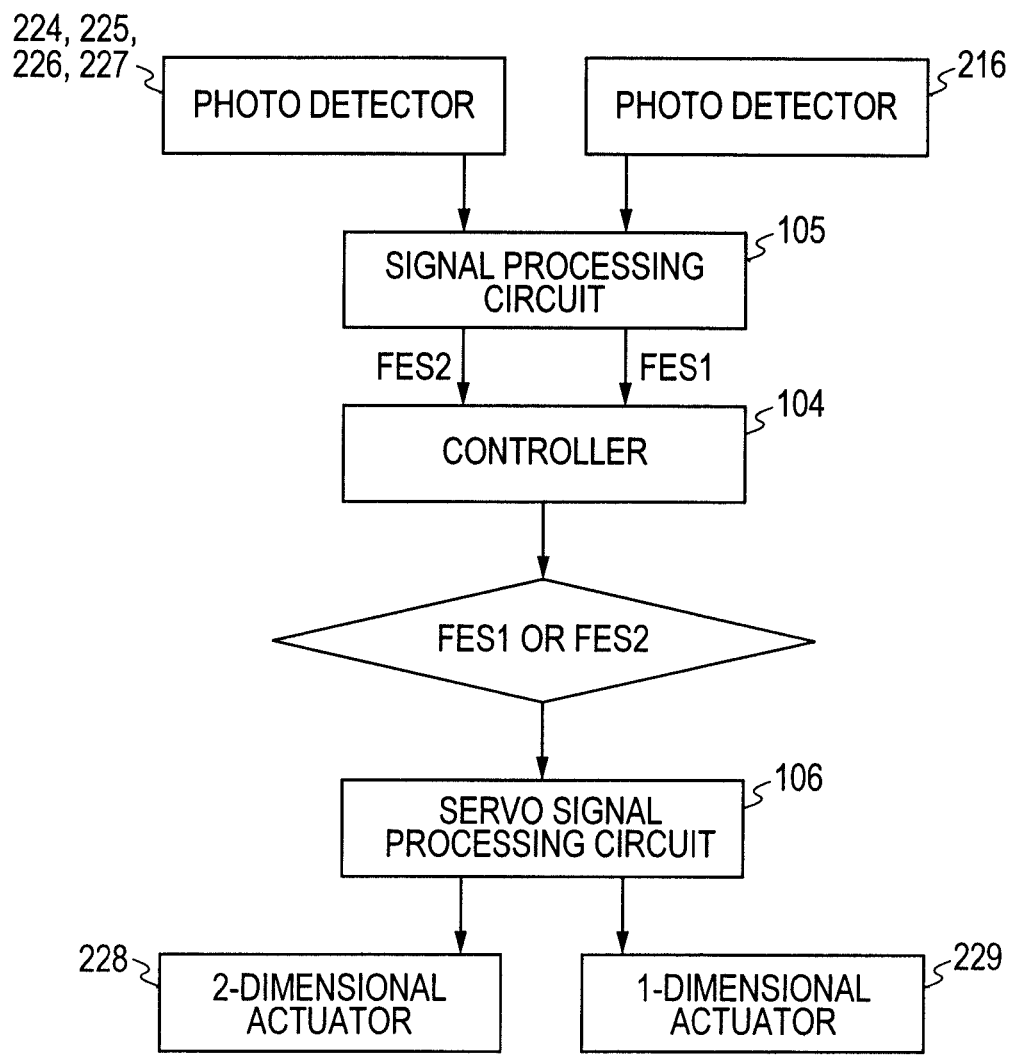
FIG. 8 is a flowchart showing focus control according to the present invention.

In this embodiment, the focus error signals FES 1 and FES 2 can be generated from the photo detector 216 that only detects the signal light 205 and the individual photo detectors 224, 225, 226, and 227 that detect the combined light beam of the signal light 205 and the reference light 206. The signal FES 2 receives a smaller influence of interlayer crosstalk than the signal FES 1 does. However, it is likely that the signal FES 2 is unsuitable for counting the number of layers of the multilayer optical disk or for switching between the recording layers (interlayer jump) since the S-shaped focus error signal from the layer apart from the focus position of the objective lens 208 becomes smaller. Now, as shown in FIG. 8, for example, it is also possible to switch between the focus error signals by the controller 104 of the optical information recording and reproducing apparatus 1 shown in FIG. 1, in such a way that the signal FES 1 is used for the focus error signal when it is also necessary to use the S-shaped focus error signals in the recording layer as wells in the layer other than the recording layer, such as in reproducing an optical disk having a smaller number of layers, in the initial adjustment of the optical information recording and reproducing apparatus 1 such as in installing the optical disk 209 in the optical information recording and reproducing apparatus 1 for counting the number of layers, or in switching between the recording layers of the multilayer optical disk (interlayer jump), whereas the signal FES 2 is used for the focus error signal when a multilayer optical disk is recorded and reproduced without receiving the influence of interlayer crosstalk as less as possible.

The tracking error signal generated at the signal processing circuit 105 is fed back to the tracking drive terminal of the 2-dimensional actuator 228 mounted with the objective lens 208, through the controller 104 and the servo control circuit 106, and controlled in a closed loop.

2-6. Reference Light Reflector

The reference light reflector 211 is implemented by a reflecting mirror, for example. In this case, it is necessary to adjust the slope of the mirror so as not to incline to the optical axis of the reference light 206 that the reflected light at the reference light reflector 211 enters. To this end, it is also possible to provide a mechanism that detects and feeds the slopes of the wave front of the reflecting mirror and the reference light 206 back to the reference light reflector 211 for adjusting the slope of the wave front of the reference light 206. Alternatively, the reference light reflector 211 is implemented by a condenser lens and a reflecting mirror. The reference light 206 is focused by the condenser lens, and the reflecting mirror is placed at the focus position. Thus, the reference light that reflects in the opposite direction of the incident light can be produced. In this case, the optical axis of the reference light is just shifted with respect to the signal light even if the reflecting mirror inclines, so that adjusting the reflecting mirror angle is more facilitated than the case of implementing the reference light reflector 211 only with a reflecting mirror. Alternatively, the reference light reflector 211 is implemented by a corner cube reflector. Because the corner cube reflector is a device that the reflected light always returns in the same direction as that of the incident light even when the light is caused to enter at any incident angles, it is unnecessary to adjust the slope of the wave front.

2-7. Switching Between Optical Paths in Recording and Reproduction

FIG. 2 shows a light beam diagram when reproducing information recorded on the optical disk 209; the light beam from the semiconductor laser 201 is divided into two light beams of the signal light 205 and the reference light 206. However, because the reference light is unnecessary when recording, the light transmitted through the first half wave plate 203 is converted into an s-polarized light beam, and the light beam is all reflected at the first polarizing beam splitter 204, and used for the signal light. This is implemented by rotating the first half wave plate, for example, in recording and reproduction to change the intensity ratio between the signal light and the reference light. Alternatively, it is also possible to use a liquid crystal wave plate that the polarization direction of the incident light is switched by application of voltage, or to insert or remove a half wave plate.

However, this is not applied to the case of using the focus error signal FES 2 acquired from the photo detectors 224, 225, 226, and 227 in recording.

2-8. Other Methods for Correcting Spherical Aberration

In this embodiment, an example is shown in which one of a pair of expander lenses is moved as a mechanism of spherical aberration correction. However, it is also possible that the collimating lens 202, for example, is mounted on an actuator and moved. In addition, it is also possible to use a voltage-driven liquid crystal variable phase modulating device for direct modulation of the wave front.

Second Embodiment

In this embodiment, there will be explained an exemplary optical information recording and reproducing apparatus that implements an optical signal detection method by which the tracking error signal is also detected from the photo detectors 224, 225, 226, and 227 as well as the focus error signal. In addition, regarding the optical information recording and reproducing apparatus 1 and the optical pickup 101 acceding to this embodiment, for components having the same functions as the configurations designated the same numerals and signs of FIGS. 1 and 2, which are already explained, the description is omitted.

Figure 9:
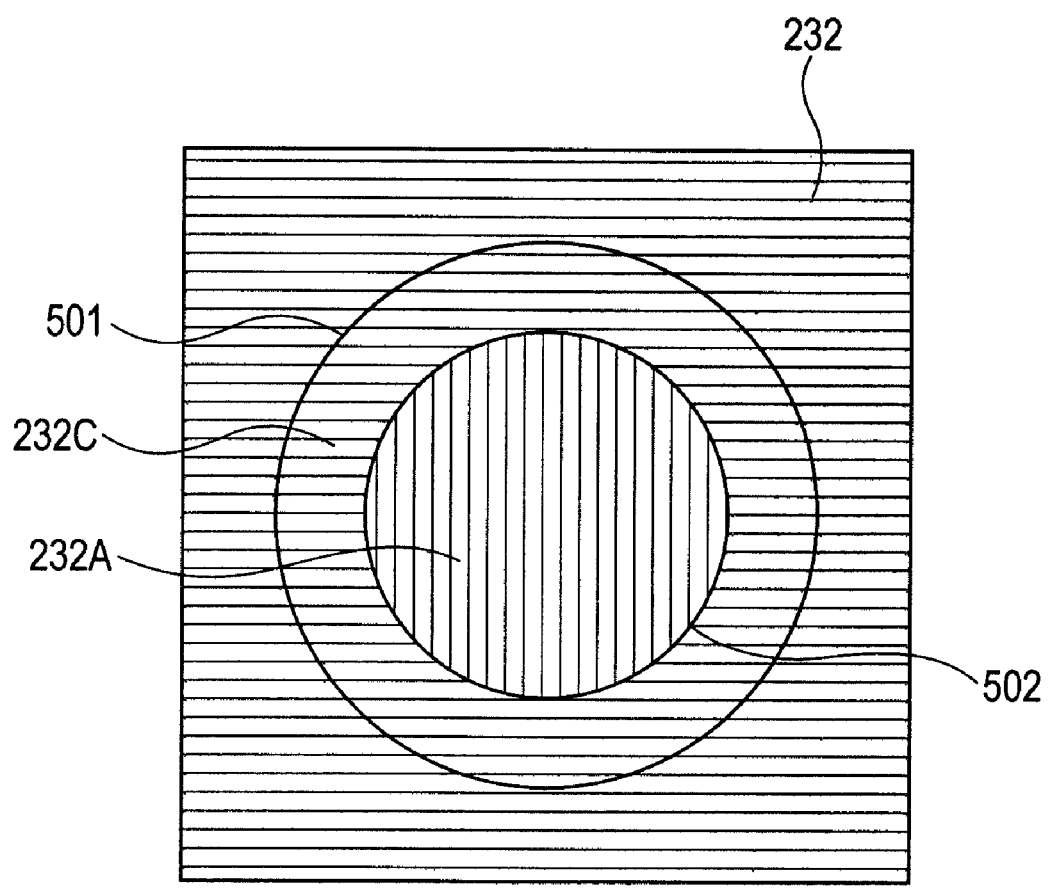
FIG. 9 is a schematic diagram showing an exemplary optical divider according to the present invention.
Figure 10:
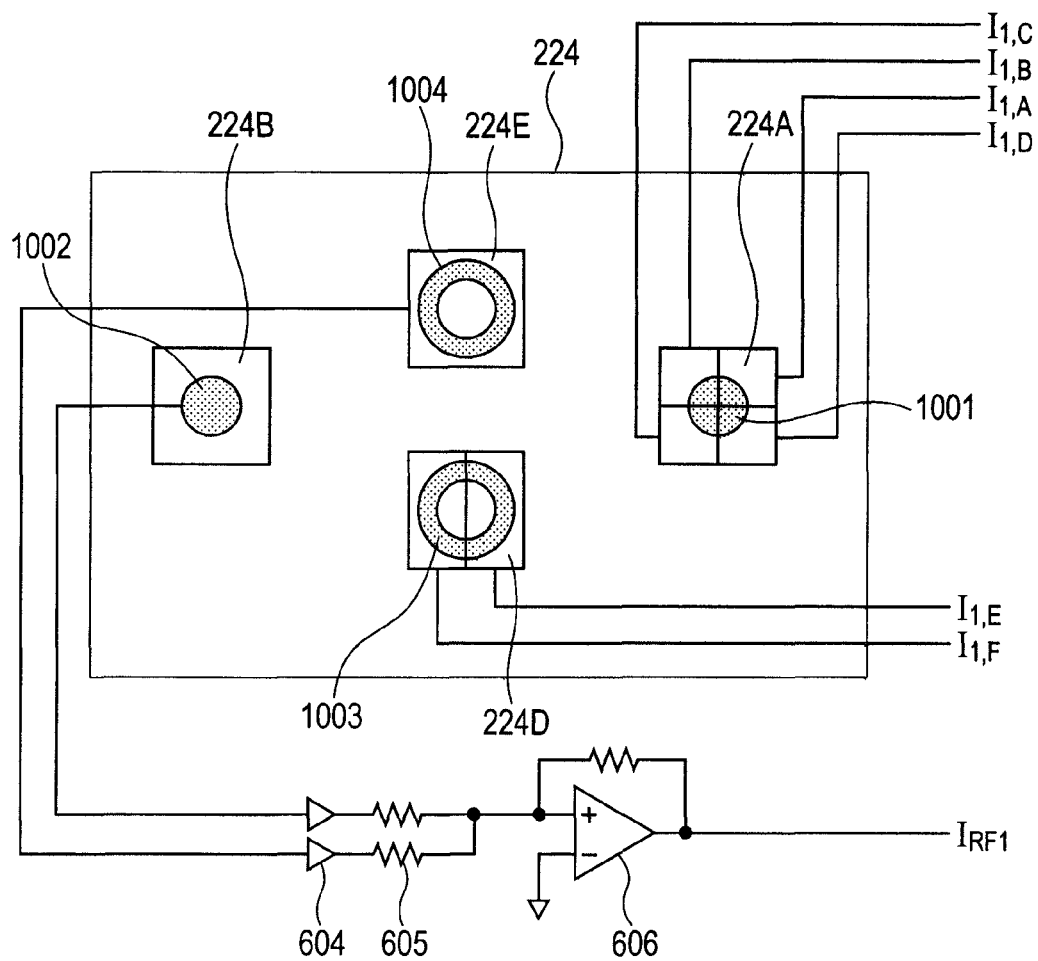
FIG. 10 is a schematic diagram showing an exemplary detector of the optical pickup according to the present invention.

FIG. 9 is a diagram showing another exemplary pattern of the optical divider 232 of the optical pickup 101 of the optical information recording and reproducing apparatus 1. In the optical divider 232, a boundary is established at the relatively small diameter 502 with respect to the diameter of the incident light beam 501, and the direction of the grating is varied between the inner region 232A and an outer region 232C. In addition, the shape of the inner region 232A is not necessarily a circular shape, which may be a shape in a relatively small area for the incident light beam 501, and may be a rectangle, for example. The light beam that enters the inner region 232A and the outer region 232C is diffracted into positive and negative first-order light beams, respectively. Thus, the light beam is divided into the inner and outer side bundles, and focused on the detectors 224, 225, 226, and 227. FIG. 10 shows an exemplary pattern of the photo detectors 224, 225, 226, and 227 according to the present invention. Because the four detectors 224, 225, 226, and 227 have the same configuration, the photo detector 224 is used for explanation below. A positive first-order diffracted light beam 1001 through the inner region 232A in the optical divider 232 is received at the four-part split light receiving region 224A, a negative first-order diffracted light beam 1002 is received at the light receiving region 224B, a positive first-order diffracted light beam 1003 through the outer region 232C in the optical divider 232 is received at a two-part split light receiving region 224D, and a negative first-order diffracted light beam 1004 is received at a light receiving region 224E. The positive first-order diffracted light beams 1001 and 1003 through the inner region 232A and the outer region 232C in the optical divider 232 are used for the servo signal, and the negative first-order diffracted light beams 1002 and 1004 are used for the RF signal. In order to use the light quantity as much as possible for the RF signal, desirably, the diffraction efficiencies of the inner region 232A and the outer region 232C in the optical divider 232 satisfy $R_{+1}<R_{-1}$ both in the inner region 232A and the outer region 232C, where the diffraction efficiencies of the positive and negative first-order diffracted light beams are respectively $R_{+1}$ and $R_{-1}$. To this end, for the grating, a sawtooth blazed grating is used, for example. The outputs of the light receiving regions 224B and 224E are converted into voltages at the buffer amplifier 604, added and subtracted at the differential amplifier 606 where a suited gain is set by the resistor 605, and then outputted as the RF signal $I_{RF1}$ shown in Equation 1. The RF signals $I_{RF2}$, $I_{RF3}$, and $I_{RF4}$ shown in Equations 2, 3, and 4 are also similarly outputted from the photo detector PD 2 (225), PD 3 (226), and PD 4 (227). In the case in which the light quantity ratio for division is not equal in the inner and outer side bundles, it is possible to adjust the resistor 605 as a variable resister. The signals $I_{1A}$, $I_{1B}$, $I_{1C}$, and $I_{1D}$ are outputted from the four-part split light receiving region 224A, and the signals $I_{1E}$ and $I_{1F}$ are outputted from the two-part split light receiving region 224D. The signals are used for calculating the focus error signal and the tracking error signal, described below. A subscript 1 represents the photo detector number, and subscripts A, B, C, D, E, and F represent the corresponding four-part split light receiving regions and two-part split light receiving regions. A signal $I_{XY}$ (X=2, 3, 4, Y=A, B, C, D, E, F) is also similarly outputted from the photo detectors PD 2 (225), PD 3 (226), and PD 4 (227). The focus error signal FES 2 is acquired according to Equation 8 or 9, for example, from an output $I_{XY}$ (X=1, 2, 3, 4, Y=A, B, C, D) obtained from the four-part split light receiving device of the photo detectors 224, 225, 226, and 227. In addition, the tracking error signal TES 2 is acquired as below, for example.

$$PP_L(X) = \sum_{Y=A,D,E}(I_{XY}-I_{X+1,Y}), PP_R(X) \quad \text{Equation 10}$$

$$= \sum_{Y=B,C,F}(I_{XY}-I_{X+1,Y})$$

$$TES2 = \{PP_L(1)^2 + PP_L(3)^2\} - \{PP_R(1)^2 - PP_R(3)^2\}$$

As similar to Equations 5 and 6, differential signals $PP_L(X)$ and $PP_R(X)$ are first found between the photo detectors PD 1 and PD 2 (X=1), and between the photo detectors PD 3 and PD 4 (X=3). After that, the sum of squares of $PP_L(1)$ and $PP_L(3)$ and the sum of squares of $PP_R(1)$ and $PP_R(3)$ are found to acquire a signal independent of the phase change in the signal light and the reference light as similar to Equation 7. Finally, a push-pull signal (a differential signal between the light receiving regions A+b+E and regions B+C+F) is acquired from differential operation for the term of the sum of squares of the signal $PP_L$ and the term of the sum of squares of the signal $PP_R$.

Regarding the tracking error signal TES 2, the light beam through the outer region 232C is used as well as the light beam through the inner region 232A, in order to detect the positive and negative diffracted light beams as the push-pull signal by tracking the optical disk.

Figure 11:
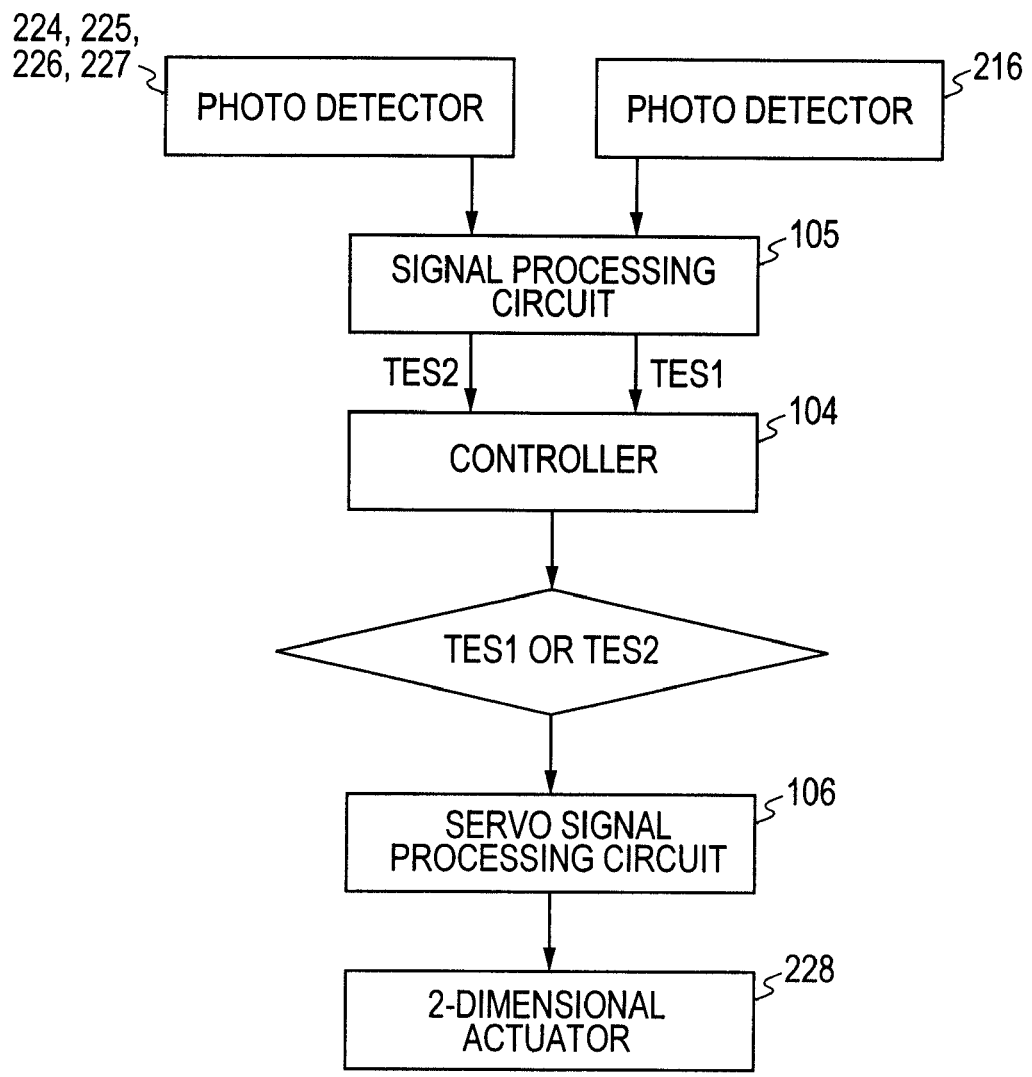
FIG. 11 is a flowchart showing tracking control according to the present invention.

In this embodiment, it is made possible to generate the focus error signals FES 1 and FES 2 and the tracking error signals TES 1 and TES 2 individually from the photo detector 216 that only detects the signal light 205 and the individual photo detectors 224, 225, 226, and 227 that detect the combined light beam of the signal light 205 and the reference light 206. For the focus error signal, the explanation is omitted because this overlaps with that in the first embodiment. Although the tracking error signal TES 2 receives a smaller influence of interlayer crosstalk than the TES 1 does. However, it is likely that the signal. TES 2 is reduced in signal light quantity when a focal point shift occurs in the objective lens. Now, as shown in FIG. 11, for example, it is also possible to switch between the tracking error signals by the controller 104 of the optical information recording and reproducing apparatus 1 shown in FIG. 1, in such a way that the signal TES 1 is used for the tracking error signal such as in reproducing an optical disk having a smaller number of layers, in the initial adjustment of the optical information recording and reproducing apparatus 1 by installing the optical disk 209 in the optical information recording and reproducing apparatus 1, or in switching between the recording layers of the multilayer optical disk (interlayer jump), whereas the signal TES 2 is used for the tracking error signal when a multilayer optical disk is recorded and reproduced without receiving the influence of interlayer crosstalk as less as possible.

Third Embodiment

In the first and second embodiments, the case of using astigmatism for focus error signal detection. However, in this embodiment, an exemplary optical information recording and reproducing apparatus using knife-edge will be described. In the case of using astigmatism in the optical pickup 101, the cylindrical lenses 233 and 234 are disposed as shown in FIG. 2, which are unnecessary when using knife-edge. In addition, at this time, the photo detectors 224, 225, 226, and 227 are arranged at the focus positions of the condenser lenses 220 and 221.

Figure 12:
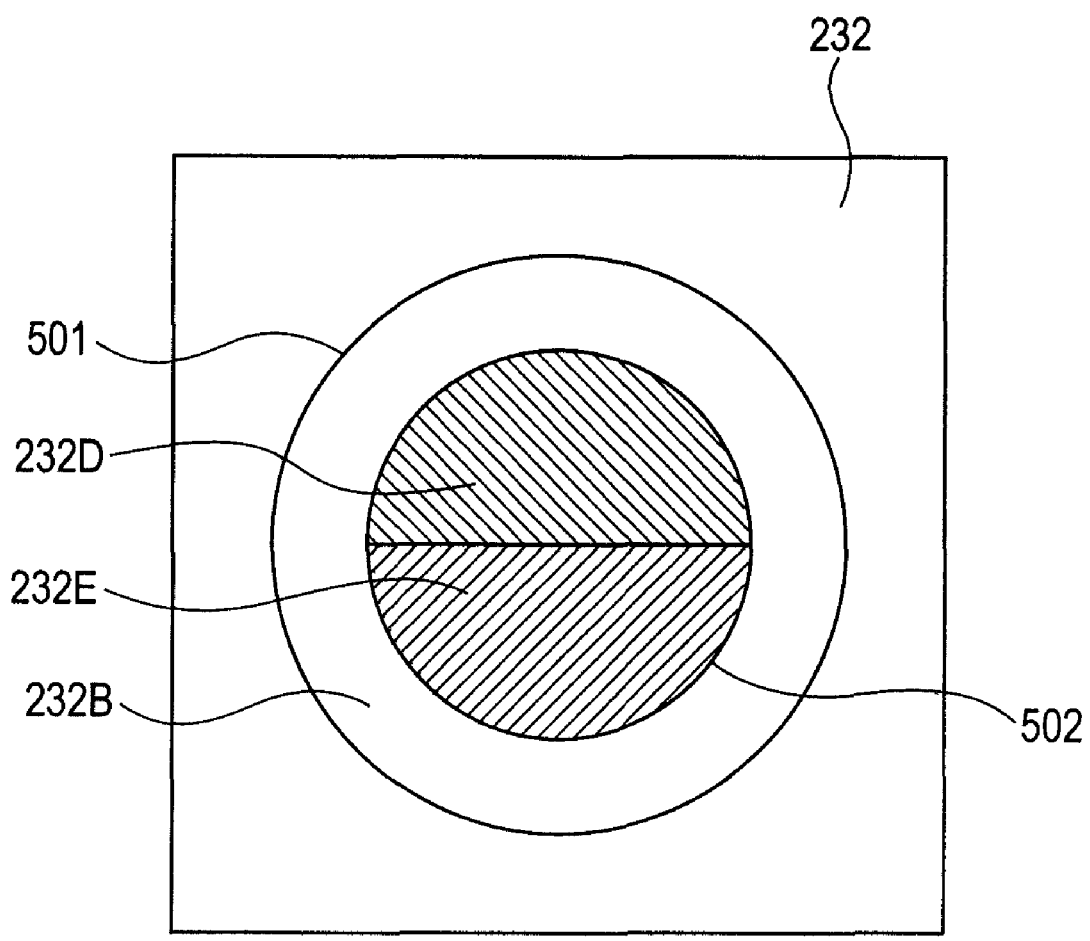
FIG. 12 is a schematic diagram showing an exemplary optical divider according to the present invention.
Figure 13:
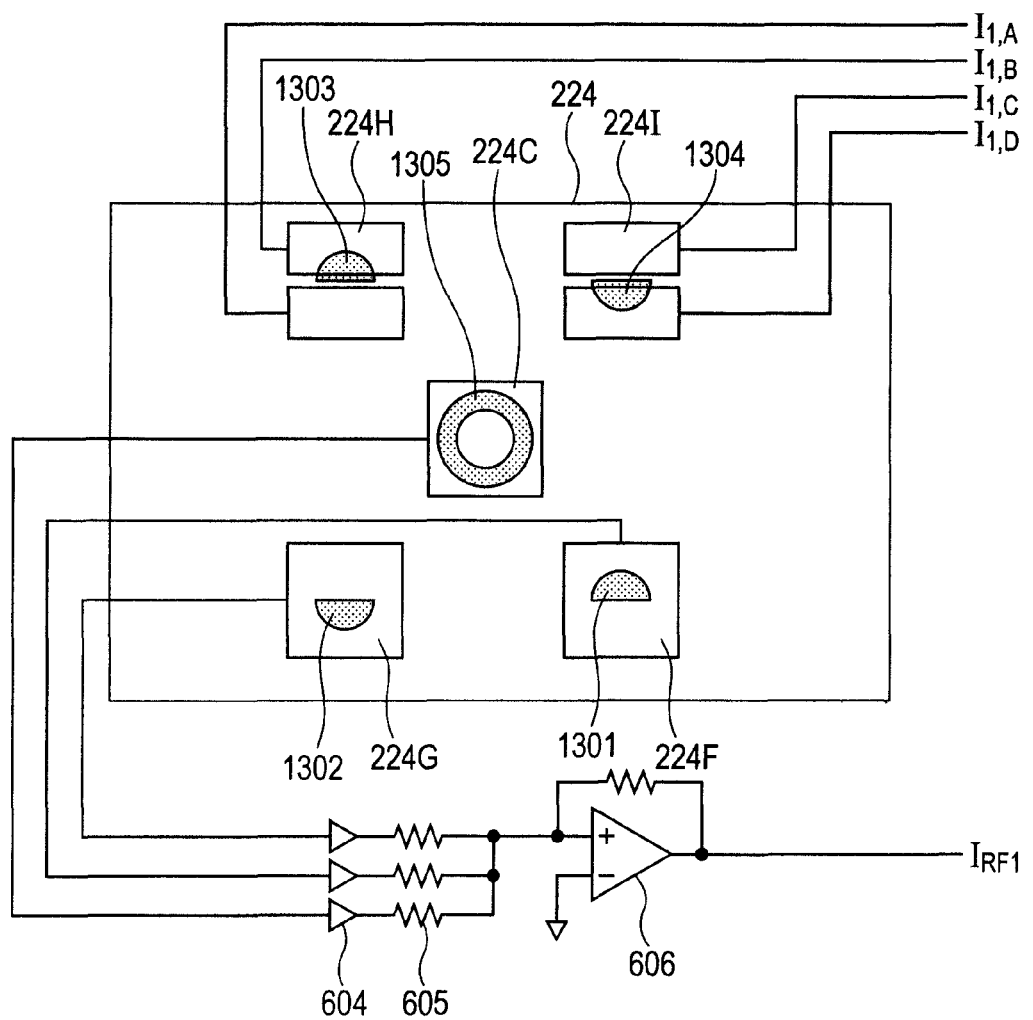
FIG. 13 is a schematic diagram showing an exemplary detector of the optical pickup according to the present invention.

FIG. 12 is a diagram showing another exemplary pattern of the optical divider 232 of the optical pickup 101 of the optical information recording and reproducing apparatus 1. In the optical divider 232, a boundary is established at the relatively small diameter 502 with respect to the diameter of the incident light beam 501, and the inner region is further divided into two upper and lower regions 232D and 232E. The inner regions 232D and 232E have a grating pattern different in the grating direction. In addition, the shapes of the inner regions 232D and 232E are not necessarily in a circular shape, which may be a shape in a relatively small area for the incident light beam 501, and may be a rectangle, for example. A light beam that enters the inner regions 232D and 232E is diffracted into positive and negative first-order light beams, and the light beam that enters the outer region 232B is transmitted. Thus, the light beam is divided into bundles in two upper and lower inner regions and an outer region, and focused on the photo detectors 224, 225, 226, and 227. FIG. 13 shows an exemplary pattern of the photo detectors 224, 225, 226, and 227 in this embodiment. Because the four photo detectors 224, 225, 226, and 227 have the same configuration, the photo detector PD 1 (224) is used for explanation below. A positive first-order diffracted light beam 1303 through the upper inner region 232D in the optical divider 232 is received at a two-part split light receiving region 224H, a negative first-order diffracted light beam 1301 is received at a light receiving region 224F, a positive first-order diffracted light beam 1304 through the lower inner region 232E in the optical divider 232 is received at a two-part split light receiving region 224I, a negative first-order diffracted light beam 1302 is received at a light receiving region 224G, and a transmitted light 1305 through the outer region 232B in the optical divider 232 is received at the light receiving region 224C. The positive first-order diffracted light beams 1303 and 1304 and the negative first-order diffracted light beams 1301 and 1302 through the inner regions 232D and 232E in the optical divider 232 are respectively used for the servo signal and the RF signal, described below. In order to use the light quantity as much as possible for the RF signal, desirably, the diffraction efficiency of the inner region in the optical divider 232 satisfies $R_{+1} < R_{-1}$, where the diffraction efficiencies of the positive and negative first-order diffracted light beams are respectively $R_{+1}$ and $R_{-1}$. To this end, for the grating in the inner region, for example, a sawtooth blazed grating is used. The outputs of the light receiving regions 224C, 224F, and 224G are converted into voltages at the buffer amplifier 604, added and subtracted at the differential amplifier 606 where a suited gain is set by the resistor 605, and then outputted as the RF signal $I_{RF1}$ shown in Equation 1. The RF signals $I_{RF2}$, $I_{RF3}$, and $I_{RF4}$ shown in Equations 2, 3, and 4 are also similarly outputted from the photo detectors PD 2 (225), PD 3 (226), and PD 4 (227). In the optical divider 232 shown in FIG. 12, the light beam is fully transmitted through the outer region 232B, whereas the light beam is partially diverged as the positive first-order diffracted light beam at the inner regions 232D and 232E. Thus, the ratio of the detected light quantity to the incident light quantity is different between the light receiving regions 224F, 224G, and 224C. For this reason, it is possible to adjust the resistor 605 as a variable resister. The signals $I_{1A}$, $I_{1B}$, $I_{1C}$, and $I_{1D}$ are outputted from the two-part split light receiving region 224H, the signals $I_{1C}$ and $I_{1D}$ are outputted from the region 224I, and the signals are used for calculating the focus error signal, described below. A subscript 1 represents the photo detector number, and subscripts A, B, C, and D represent the corresponding two-part split light receiving regions. The signal $I_{2A}$, $I_{2B}$, $I_{2C}$, $I_{2D}$, $I_{3A}$, $I_{3B}$, $I_{3C}$, $I_{3D}$, $I_{4A}$, $I_{4B}$, $I_{4C}$, and $I_{4D}$ are also similarly outputted from the photo detector PD 2 (225), PD 3 (226), and PD 4 (227). The focus error signal FES 2 is acquired as described below, for example, from an output $I_{XY}$ (X=1, 2, 3, 4, Y=A, B, C, D) obtained from the two two-part split light receiving devices of the photo detectors 224, 225, 226, and 227.

$$f(X, Y) = I_{XY} - I_{X+1,Y}$$

$$FES2 = \{f(1, A)^2 + f(3, A)^2 + f(1, C)^2 + f(3, C)^2\} - \{f(1, B)^2 + f(3, B)^2 + f(1, D)^2 + f(3, D)^2\}$$

Equation 11

As similar to Equations 5 and 6, the differential signal f (X, Y) is first found between the photo detectors PD 1 and PD 2 (X=1), and between the photo detectors PD 3 and PD 4 (X=3), where Y=A, B, C, and D. After that, the sum of squares of f (1, Y) and f (3, Y) is found in the individual regions A to D in the two two-part split light receiving devices, so that a signal is acquired, which is independent of the phase change in the signal light and the reference light as similar to Equation 7. Finally, a focus error signal according to knife-edge is obtained from differential operation for the difference between the outputs of the two two-part split light receiving devices.

Figure 14:
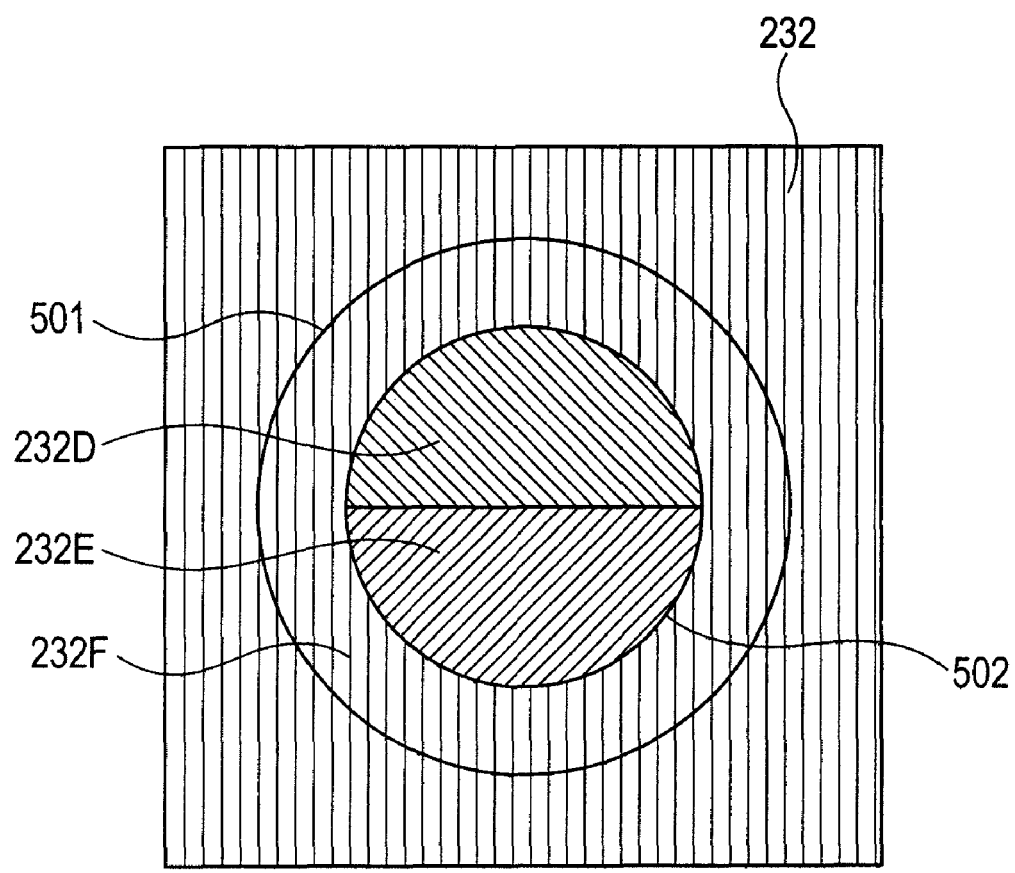
FIG. 14 is a schematic diagram showing an exemplary optical divider according to the present invention.
Figure 15:
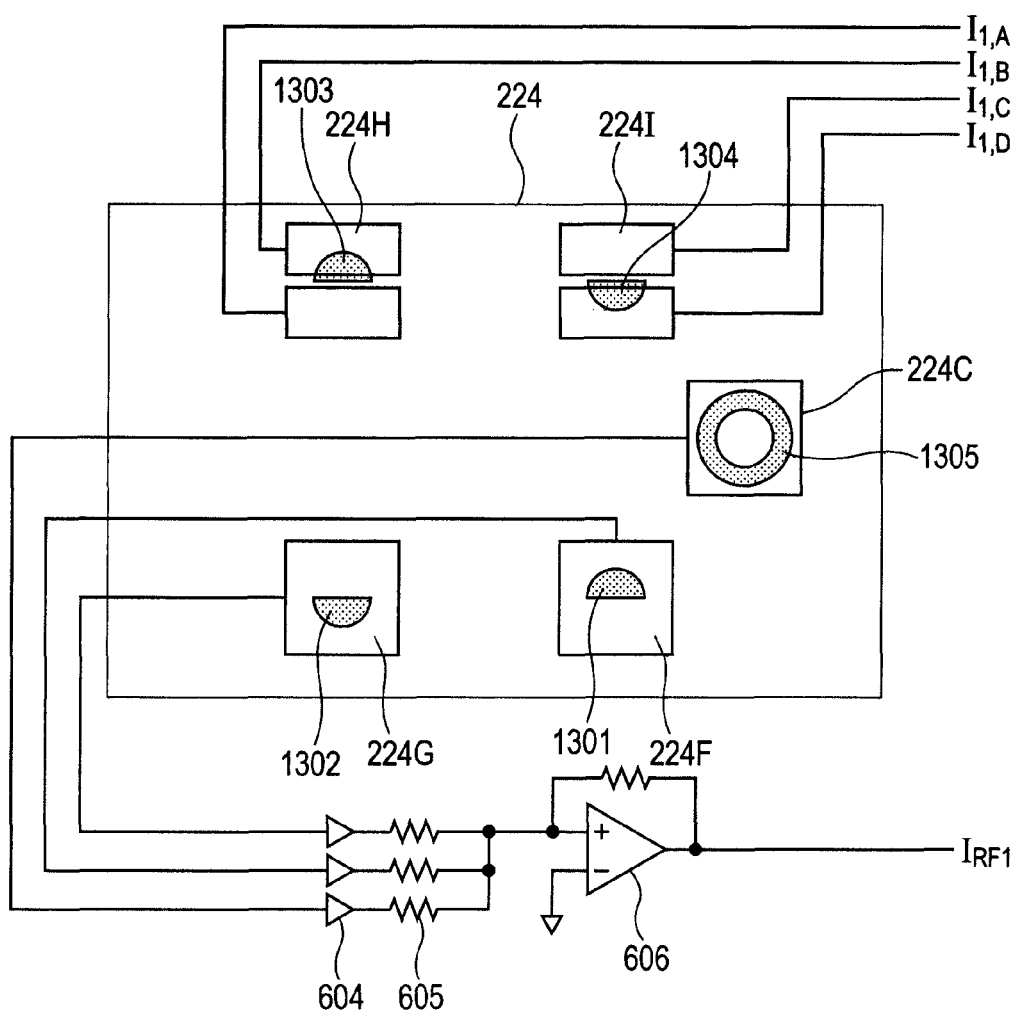
FIG. 15 is a schematic diagram showing an exemplary detector of the optical pickup according to the present invention.

In addition, in this embodiment, for the light beam that enters the outer region in the optical divider 232, the transmitted light is used, which is not diffracted. However, as shown in FIG. 14, it is also possible that an outer region 232F is provided with a grating pattern different in the grating direction from that of the inner regions 232D and 232E and that the light beam that enters the outer region 232F is diffracted into the positive first-order diffracted light beam. Originally, the light beam that enters the inner regions 232D and 232E is diffracted into the positive and negative first-order light beams, and focused on the light receiving regions 224F, 224G, 224H, and 224I. However, it is likely that a zero-order transmitted light beam is produced and focused on the detector 224C due to fabrication error or the like in the grating shape of the grating. Thus, the light beam that enters the outer region 232F is diffracted in the direction different from that of the inner regions 232D and 232E, so that the light beam that enters the outer region 232F is separated from the zero-order transmitted light beam in the inner region for detection. FIG. 15 shows the pattern of the photo detector 224 in this case. The position of the light receiving region 224C for the outer region 232F is different from that in FIG. 13.

Fourth Embodiment

In this embodiment, an exemplary optical information recording and reproducing apparatus using spot size for focus error signal detection will be described. In the case of using astigmatism in the optical pickup 101, the cylindrical lenses 233 and 234 are arranged as shown in FIG. 2, which are unnecessary when using spot size. In addition, at this time, the photo detectors 224, 225, 226, and 227 are arranged in front or on the rear side of the focus positions of the condenser lenses 220 and 221. Alternatively, it is also possible to arrange two detectors in front and on the rear side of the focus positions of the condenser lenses 220 and 221 for using differential spot size.

Figure 16:
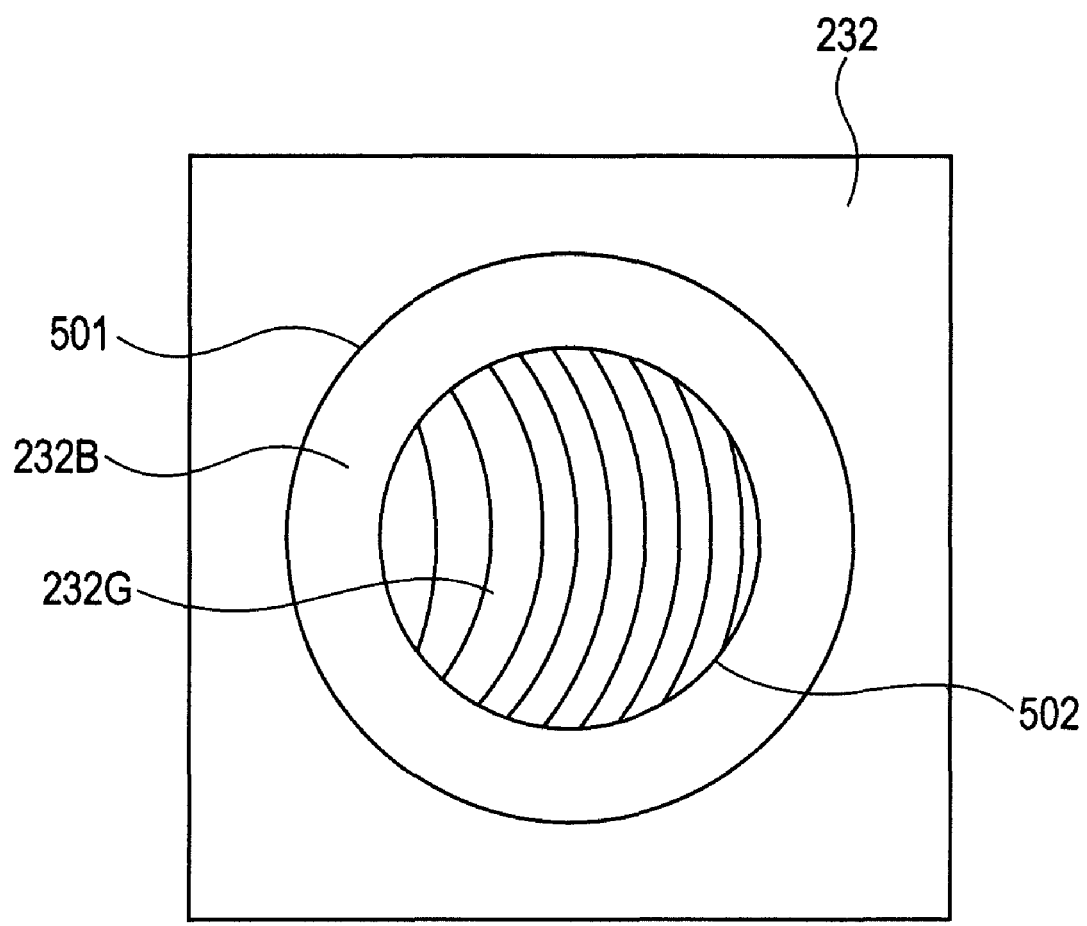
FIG. 16 is a schematic diagram showing an exemplary optical divider according to the present invention.

FIG. 16 is a diagram showing another exemplary pattern of the optical divider 232 of the optical pickup 101 of the optical information recording and reproducing apparatus 1. In the optical divider 232, a boundary is established at the relatively small diameter 502 with respect to the diameter of the incident light beam 501, and a grating pattern is provided only for the inner region 232G between an inner region 232G and the outer region 232B. The inner region 232G has a curved grating in order to cause a lens action to the diffracted light in the inner region. In addition, the shape of the inner region 232G is not necessarily in a circular shape, which may be a shape in a relatively small area for the incident light beam 501, and may be a rectangle, for example. A light beam that enters the inner region 232G is diffracted into positive and negative first-order light beams, and the light beam that enters the outer region 232B is transmitted. Thus, the light beam is divided into the inner and outer side bundles, and focused on the photo detectors 224, 225, 226, and 227.

Figure 17:
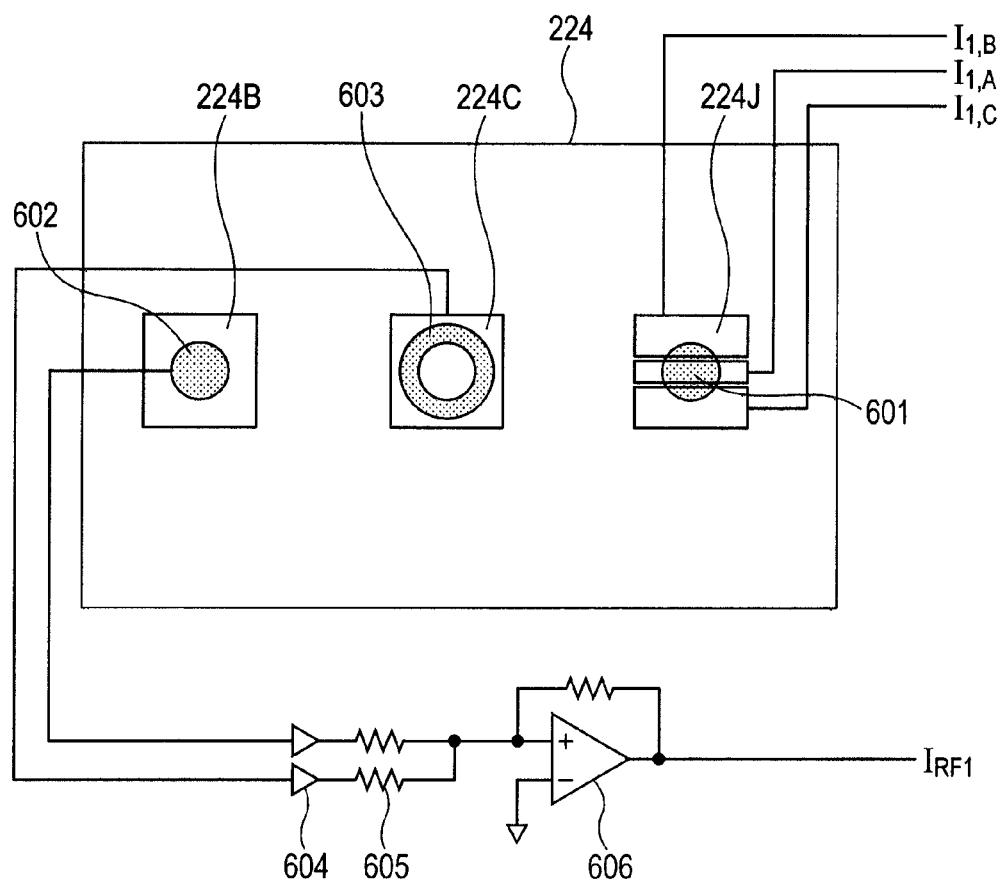
FIG. 17 is a schematic diagram showing an exemplary detector of the optical pickup according to the present invention.

FIG. 17 shows an exemplary pattern of the photo detectors 224, 225, 226, and 227 in this embodiment. Because the four photo detectors 224, 225, 226, and 227 have the same configuration, the photo detector PD 1 (224) is used for explanation below. The positive first-order diffracted light beam 601 through the inner region 232G in the optical divider 232 is received at a three-part split light receiving region 224J, the negative first-order diffracted light beam 602 is received at the light receiving region 224B, and the transmitted light beam 603 through the outer region 232B of the optical divider 232 is received at the light receiving region 224C. The positive first-order diffracted light beam 601 and the negative first-order diffracted light beam 602 through the inner region 232G in the optical divider 232 are respectively used for the servo signal and the RF signal, described below. In order to use the light quantity as much as possible for the RF signal, desirably, the diffraction efficiency of the inner region in the optical divider 232 satisfies $R_{+1} < R_{-1}$, where the diffraction efficiencies of the positive and negative first-order diffracted light beams are respectively $R_{+1}$ and $R_{-1}$. To this end, for the grating in the inner region, for example, a sawtooth blazed grating is used. The outputs of the light receiving regions 224B and 224C are converted into voltages at the buffer amplifier 604, added and subtracted at the differential amplifier 606 where a suited gain is set by the resistor 605, and then outputted as the RF signal $I_{RF1}$ shown in Equation 1. The RF signals $I_{RF2}$, $I_{RF3}$, and $I_{RF4}$ shown in Equations 2, 3, and 4 are also similarly outputted from the photo detectors PD 2 (225), PD 3 (226), and PD 4 (227). In the optical divider 232 shown in FIG. 16, the light beam is fully transmitted through the outer region 232B, whereas the light beam is partially diverged as the positive first-order diffracted light beam at the inner region 232G. Thus, the ratio of the detected light quantity to the incident light quantity is different between the light receiving regions 224B and 224C. For this reason, it is possible to adjust the resistor 605 as a variable resister. The signal $I_{1A}$, $I_{1B}$, and $I_{1C}$ are outputted from the three-part split light receiving region 224J, and used for calculating the focus error signal, described below. A subscript 1 represents the photo detector number, and subscripts A, B, C, and D represent the corresponding three-part split light receiving regions. The signal $I_{2A}$, $I_{2B}$, $I_{2C}$, $I_{3A}$, $I_{3B}$, $I_{3C}$, $I_{4A}$, $I_{4B}$, and $I_{4C}$ are also similarly outputted from the photo detector PD 2 (225), PD 3 (226), and PD 4 (227). The focus error signal FES 2 is acquired as described below, for example, from an output $I_{XY}$ (X=1, 2, 3, 4, Y=A, B, C) obtained from the three-part split light receiving device of the photo detectors 224, 225, 226, and 227.

$$f(X,Y) = I_{XY} - I_{X+1,Y}$$

$$FES2 = \{f(1,A)^2 + f(3,A)^2\} - \{f(1,B)^2 + f(3,B)^2 + f(1,C)^2 + f(3,C)^2\}$$

Equation 12

As similar to Equations 5 and 6, the differential signal f (X, Y) is first found between the photo detectors PD 1 and PD 2 (X=1), and between the photo detectors PD 3 and PD 4 (X=3), where Y=A, B, and C. After that, the sum of squares of f (1, Y) and f (3, Y) is found in the individual regions A to C in the three-part split light receiving device, so that a signal is acquired, which is independent of the phase change in the signal light and the reference light as similar to Equation 7. Finally, a focus error signal is acquired from differential operation for the sum of the outputs from the center region and the two outer regions in the three-part split light receiving device.

What is claimed is:

1. An optical information reproducing apparatus comprising:
    a laser source;
    a first optical divider configured to divide a light beam emitted from the laser source;
    a condensing optical system configured to focus on an optical information recording medium one of light beams divided at the first optical divider, the light beam being emitted from the laser source;
    a variable focusing mechanism configured to cause a focus position of the light beam to be variable, the light beam being focused by the condensing optical system;
    an interference optical system configured to cause signal light and reference light to optically interfere with each other, the signal light being focused on and reflected off the optical information recording medium, the reference light being obtained from the other of the divided light beams;
    a splitting optical system configured to divide a coherent light beam at the interference optical system into a plurality of coherent light beams;
    a plurality of detectors configured to individually detect the plurality of coherent light beams divided at the splitting optical system in a state in which phase relations are different from each other; and
    a second optical divider configured to separate the plurality of coherent light beams into a first light bundle near an optical axis and a second light bundle in an edge portion and diverge the first and second light bundles so that the first and second light bundles are focused on the plurality of detectors,
    wherein: a focus error signal is detected for the first light bundle; and
    the focus error signal is used to control the variable focusing mechanism.

2. The optical information reproducing apparatus according to claim 1,
    wherein: the second optical divider has a first light beam divider configured to further divide the first light bundle into at least two light bundles; and
    a focus error signal is detected from at least one of the light bundles divided by the first light beam divider, and a readout signal is detected from the other of the light bundles.

3. The optical information reproducing apparatus according to claim 2,
    wherein: the second optical divider has a second light beam divider configured to further divide the second light bundle into at least two light bundles; and
    a tracking error signal is detected from at least one of the light bundles divided by the second light beam divider and at least one of the light bundles divided by the first light beam divider, and a readout signal is detected from the other of the light bundles divided by the second light beam divider.

4. The optical information reproducing apparatus according to claim 2,
    wherein the light bundle divided by the first light beam divider satisfies $R_{+1} < R_{-1}$, where a light quantity of the light bundle used to detect a focus error signal or tracking error signal is $R_{+1}$, and a light quantity of the light bundle used to detect a readout signal is $R_{-1}$.

5. The optical information reproducing apparatus according to claim 3,
    wherein the light bundle divided by the second light beam divider satisfies $R_{+1} < R_{-1}$, where a light quantity of the light beam used to detect a focus error signal or tracking error signal is $R_{+1}$, and a light quantity of the light beam used to detect a readout signal is $R_{-1}$.

6. The optical information reproducing apparatus according to claim 1, further comprising a third optical divider configured to divide the signal light,
    wherein a focus error signal, a tracking error signal, or both are detected from one of the light bundles divided by the third optical divider.

7. An optical information reproducing apparatus comprising:
    a laser source;
    a first optical divider configured to divide a light beam emitted from the laser source;
    a condensing optical system configured to focus on an optical information recording medium one of light beams divided at the first optical divider, the light beam being emitted from the laser source;
    a variable focusing mechanism configured to cause a focus position of the light beam to be variable, the light beam being focused by the condensing optical system;
    an interference optical system configured to cause signal light and reference light to optically interfere with each other, the signal light being focused on and reflected off the optical information recording medium, the reference light being obtained from the other of the divided light beams;
    a splitting optical system configured to divide a coherent light beam at the interference optical system into a plurality of coherent light beams;
    a plurality of detectors configured to individually detect the plurality of coherent light beams divided at the splitting optical system in a state in which phase relations are different from each other;
    a second optical divider configured to separate the plurality of coherent light beams into a first light bundle near an optical axis and a second light bundle in an edge portion and diverge the first and second light bundles so that the first and second light bundles are focused on the plurality of detectors;
    a third optical divider configured to divide the signal light; and
    a selector configured to switch between a focus error signal acquired from the signal light divided by the third optical divider and a focus error signal acquired from the coherent light beam detected by the plurality of detectors,
    wherein the variable focusing mechanism is controlled by switching between the focus error signals by the selector.

* * * * *